(12) United States Patent
Kudoh et al.

(10) Patent No.: US 10,300,959 B2
(45) Date of Patent: May 28, 2019

(54) VEHICLE REAR BODY STRUCTURE

(71) Applicant: HONDA MOTOR CO., LTD., Tokyo (JP)

(72) Inventors: Akihisa Kudoh, Saitama (JP); Kohei Narita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 15/580,130

(22) PCT Filed: Apr. 18, 2016

(86) PCT No.: PCT/JP2016/062282
§ 371 (c)(1),
(2) Date: Dec. 6, 2017

(87) PCT Pub. No.: WO2016/199499
PCT Pub. Date: Dec. 15, 2016

(65) Prior Publication Data
US 2018/0297642 A1 Oct. 18, 2018

(30) Foreign Application Priority Data
Jun. 8, 2015 (JP) .................................. 2015-115880

(51) Int. Cl.
*B62D 25/08* (2006.01)
*B62D 25/20* (2006.01)

(52) U.S. Cl.
CPC .......... *B62D 25/088* (2013.01); *B62D 25/08* (2013.01); *B62D 25/087* (2013.01); *B62D 25/2027* (2013.01)

(58) Field of Classification Search
CPC .......................... B62D 25/088; B62D 25/2027

USPC ................. 296/203.01, 203.04, 193.08
See application file for complete search history.

(56) References Cited

U.S. PATENT DOCUMENTS

| | | |
|---|---|---|
| 2004/0232647 A1 | 11/2004 | Kim |
| 2010/0032229 A1 | 2/2010 | Kim |
| 2010/0072787 A1 | 3/2010 | Abe et al. |
| 2015/0008703 A1 | 1/2015 | Furusaki et al. |
| 2015/0183467 A1 | 7/2015 | Ebihara |

(Continued)

FOREIGN PATENT DOCUMENTS

| | | |
|---|---|---|
| CN | 101643089 A | 2/2010 |
| CN | 104114438 A1 | 10/2014 |

(Continued)

OTHER PUBLICATIONS

Jan. 21, 2019, Chinese Office Action issued for related CN Application No. 201680033289.4.

(Continued)

*Primary Examiner* — Dennis H Pedder
(74) *Attorney, Agent, or Firm* — Paratus Law Group, PLLC

(57) ABSTRACT

A vehicle rear body structure includes a rear bulkhead that partitions a vehicle interior and a rear trunk and a damper base that is joined to the rear bulkhead through a wheel house. The damper base is joined to the wheel house, and thus a damper supporting portion is formed in a bag shape. The damper supporting portion is coupled to a rear frame through the rear bulkhead and is coupled to the rear frame through a house rear corner ridge. The house rear corner ridge and the rear bulkhead are formed in an inverted V-shape.

4 Claims, 19 Drawing Sheets

(56) References Cited

U.S. PATENT DOCUMENTS

| | | |
|---|---|---|
| 2015/0251703 A1 | 9/2015 | Yamada et al. |
| 2016/0221609 A1 | 8/2016 | Furusaki et al. |
| 2016/0272248 A1 | 9/2016 | Furusaki et al. |

FOREIGN PATENT DOCUMENTS

| | | |
|---|---|---|
| CN | 104512475 A | 4/2015 |
| CN | 104583060 A | 4/2015 |
| CN | 104602993 A | 5/2015 |
| JP | H02-258481 A | 10/1990 |
| JP | 3214342 B | 10/2001 |
| JP | 2004-345624 A | 12/2004 |
| JP | 2008-254604 A | 10/2008 |
| JP | 4376277 B | 12/2009 |
| JP | 2012-236601 A | 12/2012 |

OTHER PUBLICATIONS

Jul. 5, 2016, International Search Report issued for related international application No. PCT/JP2016/062282.

VEHICLE REAR BODY STRUCTURE

CROSS REFERENCE TO PRIOR APPLICATION

This application is a National Stage Patent Application of PCT International Patent Application No. PCT/JP2016/062282 (filed on Apr. 18, 2016) under 35 U.S.C. § 371, which claims priority to Japanese Patent Application No. 2015-115880 (filed on Jun. 8, 2015), which are all hereby incorporated by reference in their entirety.

TECHNICAL FIELD

The present invention relates to a vehicle rear body structure in which a rear frame extends in a front-and-rear direction of a vehicle body, a wheel house is provided in the rear frame, and a damper is disposed on a side of a vehicle exterior of the wheel house.

BACKGROUND ART

A vehicle rear body structure is known in which a rear bulkhead is interposed between left and right rear wheel houses, an upper end of the rear bulkhead is coupled to a damper attaching portion of the rear wheel house, and an upper part of a shock absorber (hereinafter, referred to as a "damper") is coupled to the damper attaching portion of the rear wheel house.

This vehicle rear body structure is configured to support a load input from the damper by increasing a plate thickness of the damper attaching portion (for example, see Patent Literature 1).

In the vehicle rear body structure disclosed in Patent Literature 1, however, since the plate thickness of damper attaching portion is increased, an increase in vehicle weight is not suppressed. Further, it is difficult to favorably support the load input from the damper merely by increasing the plate thickness of the damper attaching portion, and the damper attaching portion may be deformed by the load input from the damper.

In addition, a vehicle rear body structure is known in which damper attaching portions of left and right rear wheel houses are reinforced by a box body and a damper is coupled to a bottom of the box body and the damper attaching portion. An opening is formed in a ceiling portion of the box body, and the damper is coupled to the bottom of the box body and the damper attaching portion using the opening.

When the damper attaching portion is reinforced by the box body, rigidity of the damper attaching portion can be increased (for example, see, Patent Literature 2).

In the vehicle rear body structure disclosed in Patent Literature 2, the opening is formed in the ceiling portion of the box body. Therefore, ideas to increase the plate thickness of the box body are required as a means of securing the rigidity of the box body. However, when the plate thickness of the box body is increased, an increase in vehicle weight is not suppressed, resulting in leaving room for improvement from this viewpoint.

PRIOR ART LITERATURE

Patent Literature

Patent Literature 1: JP-B-3214342
Patent Literature 2: JP-B-4376277

SUMMARY OF THE INVENTION

Problem that the Invention is to Solve

An object of the present invention is to provide a vehicle rear body structure capable of suppressing an increase in weight and suitably supporting a load input from a damper.

Means for Solving the Problem

The present invention is to provide a vehicle rear body structure including:
a rear flame extending in a front-and-rear direction of a vehicle body;
a wheel house provided in the rear frame;
a damper disposed on a side of a vehicle exterior of the wheel house and supporting a rear wheel;
a rear bulkhead that is joined to the wheel house to partition a vehicle interior and a rear trunk and is gradually inclined downward to a front of the vehicle body toward the rear frame; and
a damper base that is joined to the rear bulkhead through the wheel house so as to be disposed on the side of the vehicle exterior of the wheel house and is coupled to the damper, wherein
the wheel house includes
  a house peripheral wall that covers the rear wheel from a side of the vehicle interior and has a house corner ridge which is gradually inclined downward to a rear of the vehicle body toward the rear frame and
  a house top portion that is formed on an upper end of the house peripheral wall,
the damper base is joined to the side of the vehicle exterior of the wheel house so that a damper supporting portion is formed in a bag shape by the damper base and the wheel house,
the damper supporting portion is coupled to the rear frame through the rear bulkhead and is coupled to the rear frame through the house corner ridge, and
the rear bulkhead and the house corner ridge are formed in an inverted V-shape in a side view such that a distance between the rear bulkhead and the house corner ridge gradually widens from the damper supporting portion to the rear frame.

In this way, the damper base is joined to the wheel house and the damper supporting portion is formed in the bag shape (box shape) by the damper base and the wheel house, and thus the rigidity of the damper supporting portion can be increased. The damper is coupled to the damper base of the damper supporting portion.

Accordingly, the load input to the damper base from the damper can be suitably supported by the bag-like damper supporting portion having high rigidity. Accordingly, there is no need to increase the plate thickness of the damper base to increase the rigidity, and an increase in vehicle weight can be suppressed.

In addition, the damper supporting portion is coupled to the rear frame by the rear bulkhead, and the damper supporting portion is coupled to the rear frame at the house corner ridge.

Here, the house corner ridge is formed to have high rigidity by the corner ridge thereof. Further, the rear bulkhead is used as a frame member of the vehicle rear body structure, and the house ridge-line portion is formed in the closed cross-section in order to secure rigidity. Further, the rear frame is used as a frame member of the vehicle rear body structure and is formed in a closed cross-section in order to secure rigidity.

In this way, the rear bulkhead and the house corner ridge having high rigidity are formed in an inverted V-shape in a side view. Thereby, the damper supporting portion can be supported in a state of being stabilized by the rear bulkhead and the house corner ridge.

In this state, the load transmitted from the damper to the damper supporting portion can be suitably transmitted, as a tensile load, to the rear frame through the rear bulkhead and the house corner ridge having high rigidity. The rear frame is a frame member that extends in the front-and-rear direction of the vehicle body and has high rigidity, and the transmitted tensile load can be suitably supported by the rear frame.

In addition, the rear bulkhead is a member that is generally used as a partition wall in the vehicle having the vehicle interior and the rear trunk. The rear bulkhead can also be used as a member for forming an inverted V-shape. Thus, there is no need to provide a dedicated member for forming an inverted V-shape, and an increase in vehicle weight can be further favorably suppressed.

Preferably, the wheel house is provide on both sides in a vehicle width direction of the rear bulkhead, the rear bulkhead includes a pair of legs that are respectively joined to the wheel houses provided on the both sides in the vehicle width direction; an upper cross member that couples upper ends of the pair of legs to each other; and a lower cross member that is disposed below the upper cross member and couples lower ends of the pair of legs to each other, the rear bulkhead is formed in an annular shape by the pair of legs, the upper cross member, and the lower cross member so that an opening is formed in the rear bulkhead, the leg intersects with the upper cross member so that an upper corner is formed, and the leg intersects with the lower cross member so that a lower corner is formed, the leg includes a front plate portion that is joined to the wheel house to form a front leg wall of the leg and has a front flange protruding toward a side of the opening; and a rear plate portion that is joined to the wheel house to form an inner leg wall and a rear leg wall of the leg and has a rear flange joined to the front flange from a side of a rear of the vehicle body, the front flange and the rear flange are joined to each other to form a flange joint portion, the flange joint portion protrudes toward the opening, and the flange joint portion extends to the lower corner from the upper corner.

Here, the rear bulkhead includes the upper corner and the lower corner. It is known that the load is input from the damper is transmitted to the upper corner and the lower corner. When the load is transmitted to the upper corner and the lower corner, it is considered that stress concentrates on the upper corner and the lower corner.

Therefore, the front flange of the front plate portion and the rear flange of the rear plate portion are joined to each other, thereby forming the flange joint portion, and the flange joint portion protrudes toward the opening of the rear bulkhead. Further, the flange joint portion extends from the upper corner to the lower corner.

Therefore, the rigidity of the upper corner and the lower corner can be increased by the flange joint portion. Thus, the load transmitted to the upper corner and the lower corner can be supported by the flange joint portion. Accordingly, it is not necessary to increase the thickness of the front plate portion and the rear plate portion more than needs, and an increase in vehicle weight can be further favorably suppressed.

Preferably, the vehicle rear body structure further includes a reinforcing leg that extends upward from the rear frame along the house corner ridge and is provided in the wheel house across the house corner ridge, wherein the rear frame includes a protruding portion which protrudes upward along the wheel house, and the reinforcing leg has a lower end joined to the protruding portion and an upper end joined to the rear bulkhead.

Here, when the load is input from the damper to the damper base, a relatively large load is transmitted to the house corner ridge of the wheel house.

Therefore, the reinforcing leg is provided across the house rear corner ridge from the outer side of the wheel house. Further, the lower end of the reinforcing leg is joined to the protruding portion of the rear frame, and the upper end of the reinforcing leg is joined to the rear bulkhead.

Therefore, it is possible to further increase the rigidity of the house corner ridge, to which the relatively large load is transmitted, by the reinforcing leg, and a relatively large load can be supported by the house rear corner ridge and the reinforcing leg This makes it possible to support the relatively large load without increasing the thickness of the wheel house more than needs, for example, thereby further satisfactorily suppressing an increase in vehicle weight.

Further, the lower end of the reinforcing leg is joined to the protruding portion of the rear frame, and the upper end of the reinforcing leg is joined to the rear bulkhead. Thus, the rigidity of the rear bulkhead, the rear frame, and the wheel house (that is, the rigidity of the vehicle rear body structure) can be increased.

Preferably, the damper base includes a damper attaching portion that is disposed on the side of the vehicle exterior of the wheel house below the house top portion and is attached with the damper; a support wall that rises upward from the damper attaching portion; and a peripheral-edge flange that is formed along an outer periphery of each of the damper attaching portion and the support wall and is joined to the wheel house, and the peripheral-edge flange is joined to the wheel house so that the damper supporting portion is formed in a bag shape.

In this way, the peripheral-edge flange of the damper base is joined to the wheel house, and thus the damper supporting portion is formed in a bag shape by the damper base and the wheel house. Accordingly, the entire periphery of the damper supporting portion becomes a closed shape, and the rigidity of the damper supporting portion is increased. That is, simply by joining the peripheral-edge flange of the damper base to the wheel house, it is possible to easily form the damper supporting portion having high rigidity, and the configuration can be simplified.

Further, a height of the damper attaching portion can be adjusted by a change of a height of the support wall. Therefore, the height of the damper attaching portion can be adjusted depending on the height of the damper. This makes it possible to adjust the damper supporting portion to various types of dampers and to expand the use of the damper supporting portion.

Preferably, a bulkhead is provided inside the damper supporting portion, a lower end of the bulkhead is joined to the damper attaching portion, and an upper end of the bulkhead is joined to the house top portion, and the lower end of the bulkhead is fastened by a fastening portion with which the damper is attached to the damper supporting portion.

In this way, the bulkhead (that is, a partition wall member) is provided inside the damper supporting portion. Accordingly, the damper supporting portion is reinforced by the bulkhead, and the rigidity of the damper supporting portion can be further increased.

Further, the lower end of the bulkhead is fastened by the fastening portion of the damper. Accordingly, the load input from the damper to the damper attaching portion can be transmitted to the bulkhead through the fastening portion. Thus, the load input from the damper to the damper attaching portion can be suitably supported by the damper supporting portion through the bulkhead, and deformation of the damper attaching portion can be suppressed.

Preferably, the damper base is joined to the leg of the rear bulkhead through the wheel house, and the leg is joined to the rear frame.

Therefore, the load input to the damper base from the damper can be transmitted, as a tensile load, to the rear frame through the wheel house and the leg of the rear bulkhead.

Here, the rear frame is a frame member that extends in the front-and-rear direction of the vehicle body and has high rigidity, and the transmitted tensile load can be suitably supported by the rear frame.

Preferably, the damper base is joined to an upper end of the rear bulkhead through the wheel house, the upper end of the rear bulkhead is joined to the reinforcing leg, and the damper base is joined to the reinforcing leg through the wheel house and the upper end of the rear bulkhead.

In this way, the damper base is joined to the upper end of the rear bulkhead through the wheel house. Further, the upper end of the rear bulkhead is joined to the reinforcing leg. Accordingly, four members of the damper base, the wheel house, the upper end of the rear bulkhead, and the reinforcing leg are not joined to each other in a state of being superimposed, and the damper base can be joined to the upper end of the rear bulkhead and the reinforcing leg.

That is, three members of the damper base, the upper end of the rear bulkhead, and the wheel house are joined to each other, and the upper end of the rear bulkhead is joined to the reinforcing leg, so that the damper base can be joined to the upper end of the rear bulkhead and the reinforcing leg. Thus, the damper base can be easily joined to the reinforcing leg.

Further, the damper base is joined to the reinforcing leg through the wheel house and the upper end of the rear bulkhead. Here, the lower end of the reinforcing leg is joined to the protruding portion of the rear frame. Accordingly, the load input to the damper base from the damper can be transmitted, as a tensile load, to the rear frame through the wheel house, the upper end of the rear bulkhead, and the reinforcing leg.

The rear frame is a frame member that extends in the front-and-rear direction of the vehicle body and has high rigidity, and the transmitted tensile load can be suitably supported by the rear frame.

Preferably, the rear bulkhead includes a pair of legs that are respectively joined to the wheel houses provided on the both sides in the vehicle width direction; an upper cross member that couples upper ends of the pair of legs to each other; and a lower cross member that is disposed below the upper cross member and couples lower ends of the pair of legs to each other, the rear bulkhead is formed in an annular shape by the pair of legs, the upper cross member, and the lower cross member, and the vehicle rear body structure is configured in such a manner that: the wheel house is provided on both sides in a vehicle width direction of the rear bulkhead so that the reinforcing leg is provided on the both sides in the vehicle width direction, and the rear frame is also provided on the both sides in the vehicle width direction; a rear cross member is provided which is laid over the rear frames provided on the both sides in the vehicle width direction and is coupled to a lower end of the reinforcing leg; a triangular frame is formed to have substantially a triangular shape in a side view by the rear frame, the reinforcing leg, and the leg of the rear bulkhead and is provided on the both sides in the vehicle width direction; upper parts, front parts, and rear parts of the triangular frames provided on the both sides in the vehicle width direction are coupled to each other by the upper cross member, the lower cross member, and the rear cross member, respectively, thereby forming a triangular prism frame body; and the damper supporting portion is provided on the upper parts of the triangular frames provided on the both sides in the vehicle width direction.

In the vehicle rear body structure, the sub-frames are provided on the rear frames on both sides in the vehicle width direction and the damper is supported by the sub-frames. Accordingly, the load input from the damper to the sub-frame is preferably supported by the rear frame.

Therefore, the triangular frame is formed on both sides in the vehicle width direction by the rear frame, the reinforcing leg, and the leg. In addition, the upper parts, the front parts, and the rear parts of the triangular frames provided on the both sides in the vehicle width direction are coupled to each other by the upper cross member, the lower cross member, and the rear cross member, respectively, thereby forming the triangular prism frame body. Further, the bag-like damper supporting portion is provided on the upper parts of the triangular frames provided on the both sides in the vehicle width direction.

The damper supporting portion is a portion that is formed in the bag shape and has high rigidity. Accordingly, the triangular prism frame body can be reinforced by the damper supporting portion having high rigidity. Thus, the load transmitted from the sub-frame to the rear frame can be favorably supported by the triangular prism frame body and steering stability can be improved.

In addition, the triangular prism frame body is reinforced by the damper supporting portion having high rigidity, and thus the load transmitted from the damper to the damper supporting portion can be favorably supported by the triangular prism frame body.

Further, when the triangular prism frame body is reinforced by the damper supporting portion having high rigidity, it is possible to increase rigidity of the vehicle rear body structure while suppressing an increase in weight.

Advantage of the Invention

According to the present invention, it is possible to suppress an increase in weight of the vehicle rear body structure and to suitably support the load input from the damper to the vehicle rear body structure.

MODE FOR CARRYING OUT THE INVENTION

Figure 1:
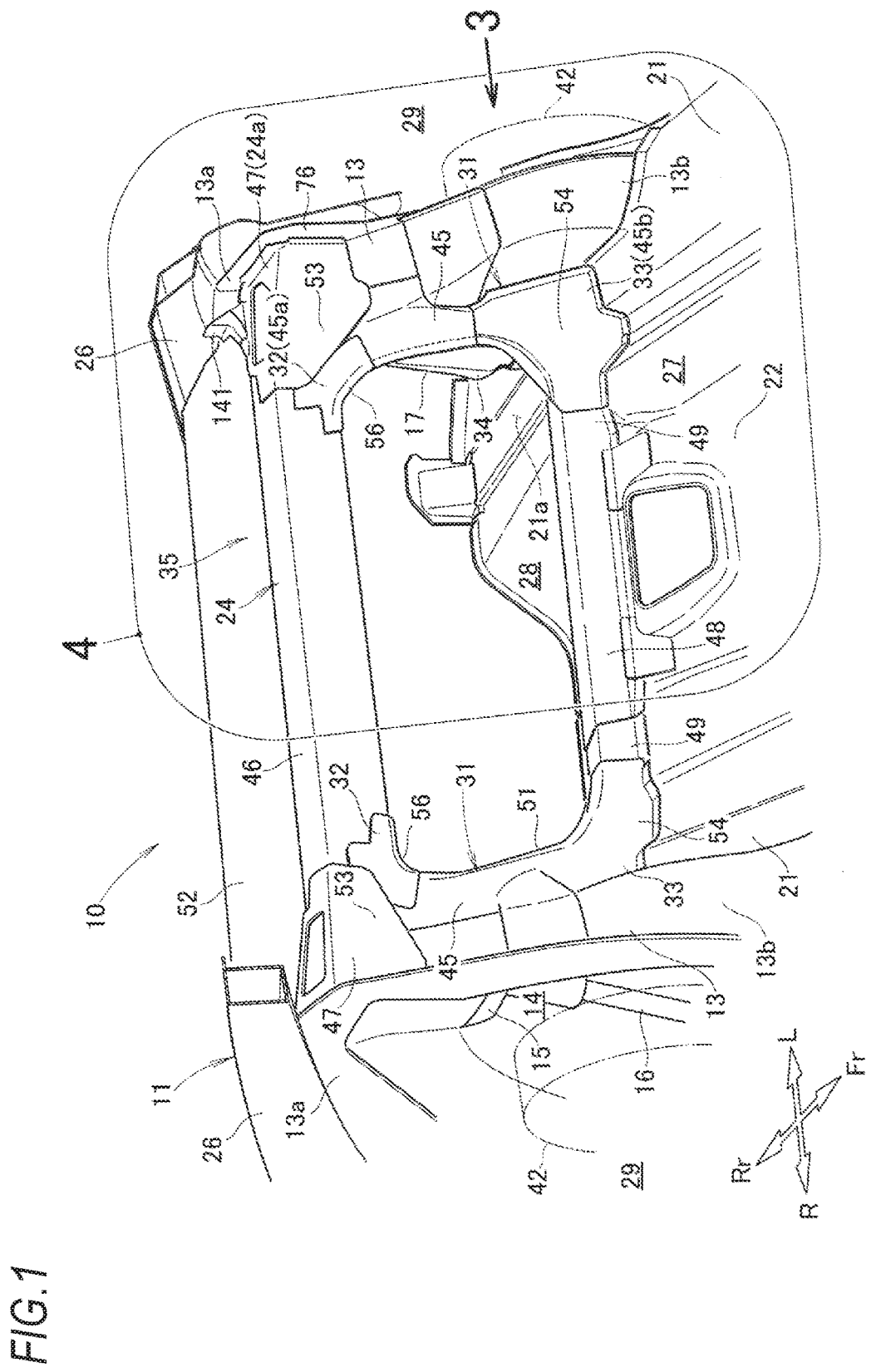
FIG. 1 is a perspective view illustrating a state of a vehicle rear body structure according to the present invention as viewed obliquely from a front side.

An embodiment for carrying out the invention will be described below with reference to the accompanying drawings. The terms "front (Fr)", "rear (Rr)", "left (L)", and "right (R)" represent respective directions as viewed from a driver.

[Embodiment]

A vehicle rear body structure 10 according to an embodiment will be described.

The vehicle rear body structure 10 is substantially a bilaterally symmetrical member, and a left member and a right member of the vehicle rear body structure 10 are given by the same reference numeral.

Figure 2:
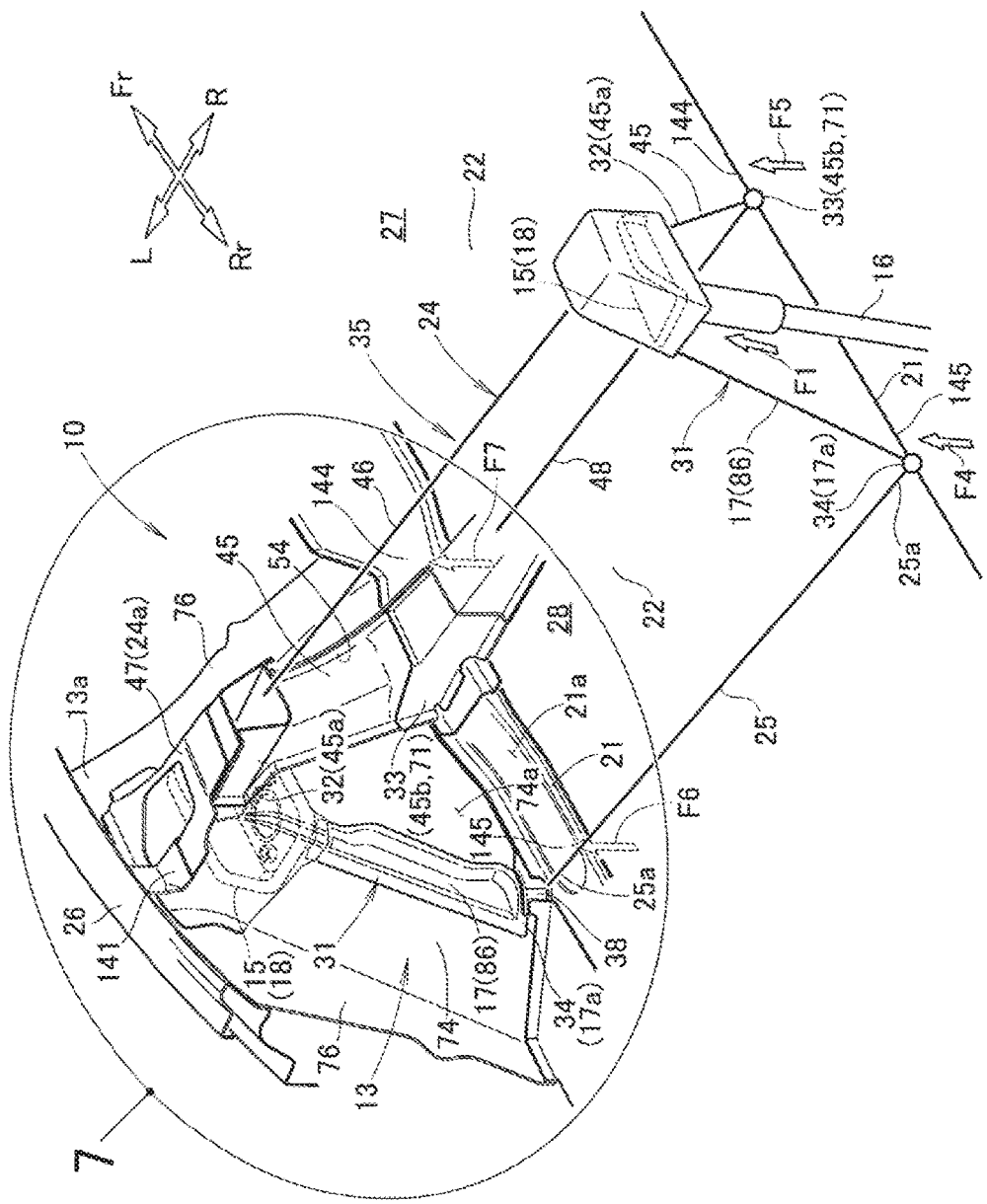
FIG. 2 is a perspective view illustrating a state of the vehicle rear body structure illustrated in FIG. 1 as viewed obliquely from a front side
Figure 3:
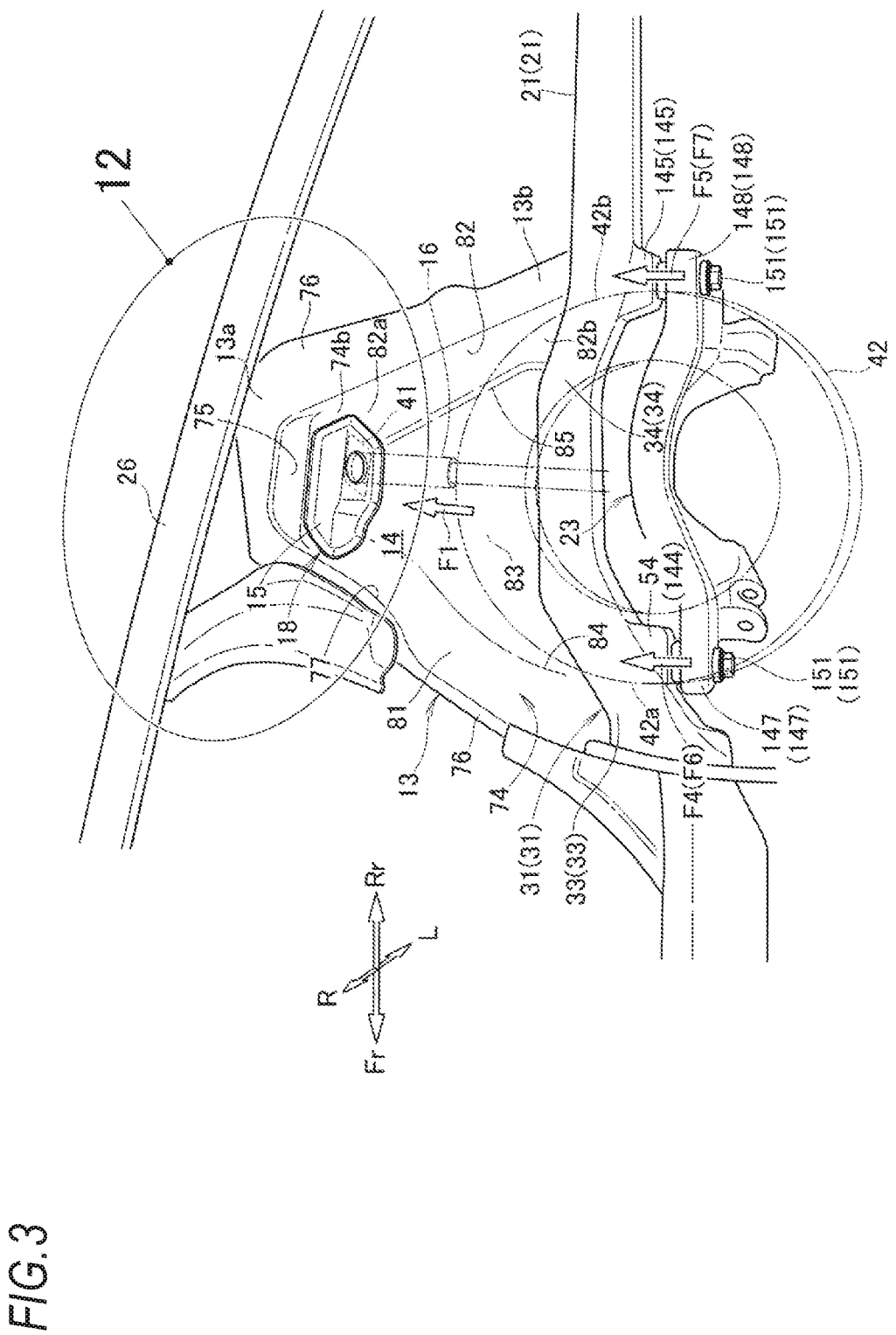
FIG. 3 is a view in a direction of arrow 3 in FIG. 1.

As illustrated in FIGS. 1 and 2, the vehicle rear body structure 10 includes a vehicle body frame 11 forming a main frame of the vehicle rear body structure 10, a pair of wheel houses 13 provided on left and right sides of the vehicle body frame 11 in a vehicle width direction, damper bases 15 provided on interiors 14 of the wheel houses 13, dampers 16 (a left damper 16 is illustrated in FIG. 3) attached to the damper bases 15, and reinforcing legs 17 provided in the wheel houses 13.

The interior 14 of the wheel house 13 is a housing portion of the damper 16 on a side of a vehicle exterior 29 of the wheel house 13. Hereinafter, the interior 14 of the wheel house 13 is referred to as a "house space 14".

The pair of wheel houses 13 are provided on both sides in the vehicle width direction, and thus the damper bases 15, the dampers 16, and the reinforcing legs 17 are provided on both sides in the vehicle width direction.

The vehicle body frame 11 includes a pair of rear frames 21 provided on left and right sides in the vehicle width direction, a floor panel 22 provide between the pair of rear frames 21, a sub-frame 23 (see FIG. 3) below the pair of rear frames 21, a rear bulkheads 24 interposed between the pair of wheel houses 13, a rear cross member 25 disposed between the pair of reinforcing legs 17, and rear pillars 26 provided at upper ends 13a of the pair of wheel houses 13.

A triangular frame 31 having substantially a triangular shape in a side view is formed, on the left side in the vehicle width direction, by the left rear frame 21, the left reinforcing leg 17, and a left leg 45 of the rear bulkhead 24. In addition, a triangular frame 31 having substantially a triangular shape in a side view is formed, on the right side in the vehicle width direction, by the right rear frame 21, the right reinforcing leg 17, and a right leg 45 of the rear bulkhead 24.

That is, the triangular frames 31 are provide on both sides of the vehicle rear body structure 10 in the vehicle width direction.

An upper part 32 of the left triangular frame 31 and an upper part 32 of the right triangular frame 31 are coupled to each other by an upper cross member 46 of the rear bulkhead 24. Further, a front part 33 of the left triangular frame 31 and a front part 33 of the right triangular frame 31 are coupled to each other by a lower cross member 48 of the rear bulkhead 24.

Further, a rear part 34 of the left triangular frame 31 and a rear part 34 of the right triangular frame 31 are coupled to each other by a rear cross member 25.

Thus, a triangular prism frame body 35 is formed by the left triangular frame 31, the right triangular frame 31, the upper cross member 46 of the rear bulkhead 24, the lower cross member 48 of the rear bulkhead 24, and the rear cross member 25.

Constituent members of the vehicle rear body structure 10 will be described in detail below with reference to left members as a representative example.

Figure 16:
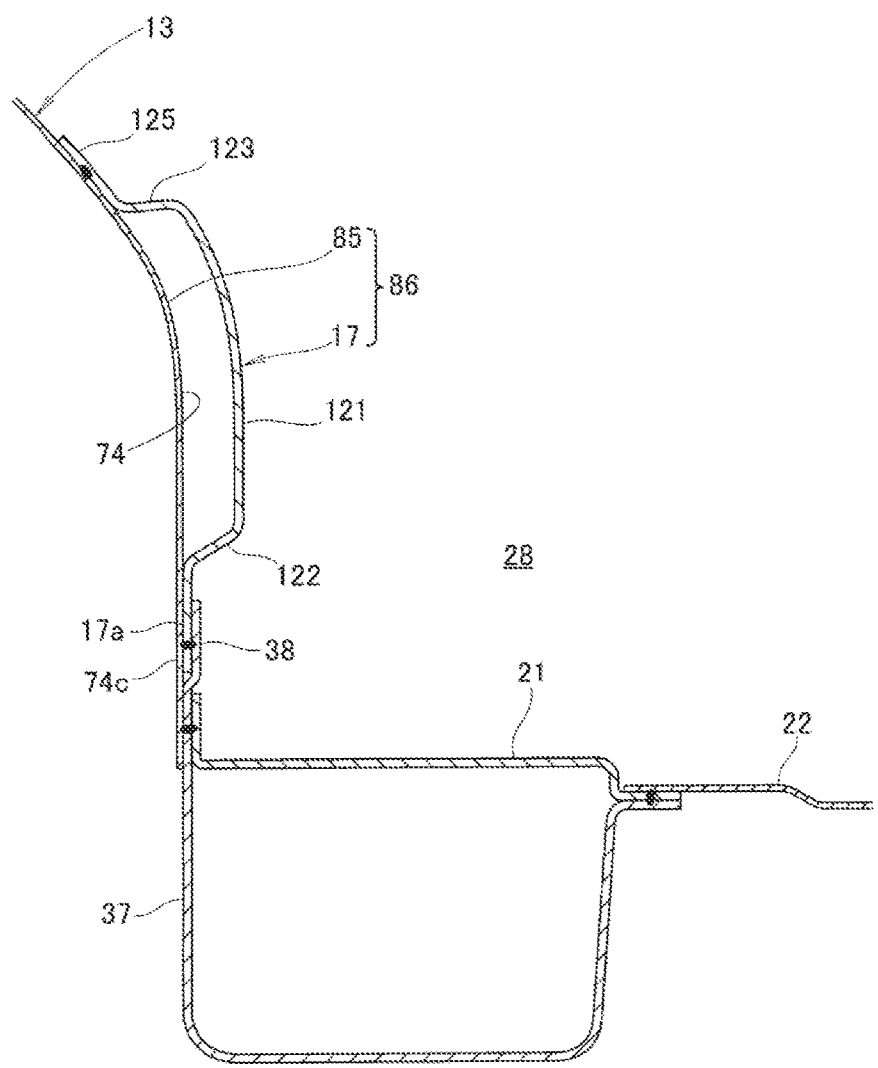
FIG. 16 is a sectional view illustrating a state of being taken along line 16-16 in FIG. 7.

The rear frame 21 is a frame member of the vehicle rear body structure 10, and is formed in a closed cross-section in order to secure rigidity (see FIG. 16). The rear frame 21 extends in a front-and-rear direction of the vehicle body, and in this state, the rear frame 21 is provided along a house peripheral wall 74 of the wheel house 13.

The rear frame 21 includes a protruding portion 38 on an outer wall 37 (see FIG. 16) at the side of the wheel house 13. The protruding portion 38 protrudes more upward than an upper surface 21a of the rear frame 21 from the outer wall 37. In this state, the protruding portion 38 is joined along an outer surface 74a of the wheel house 13 (specifically, the house peripheral wall 74), and is joined to a lower end 17a of the reinforcing leg 17.

The floor panel 22 is provided between the pair of rear frames 21, and a floor of a vehicle interior 27 is formed by the floor panel 22. The protruding portion 38 protrudes upward from the floor panel 22.

As illustrated in FIGS. 1 and 3, the sub-frame 23 is provided below the pair of rear frames 21. A left side of the sub-frame 23 is attached to the left rear frame 21, and a right side of the sub-frame 23 is attached to the right rear frame 21. Further, the left side and the right side of the sub-frame 23 are coupled to each other by a cross member.

A lower end of the left damper 16 is supported on the left side of the sub-frame 23. Similarly, a lower end of the right damper 16 is supported on the right side of the sub-frame 23.

An attachment bracket 41 provided at the upper end of the left damper 16 is attached to a damper supporting portion 18 (which will be described below), and a left rear wheel 42 is supported at the lower end of the damper 16.

Similarly to the left damper 16, an attachment bracket provided at the upper end of the right damper 16 is attached to a damper supporting portion 18 (not illustrated), and a right rear wheel 42 is supported at the lower end of the damper 16.

The rear bulkhead 24 is interposed between the pair of wheel houses 13. In addition, a left end of the rear bulkhead 24 is joined to the left wheel house 13, and a right end of the rear bulkhead 24 is joined to the right wheel house 13.

Further, the rear bulkhead 24 faces the pair of rear frames 21 and is inclined gradually downward to the front of the vehicle body. In this state, the vehicle interior 27 and the rear trunk 28 is partitioned by the rear bulkhead 24.

The rear bulkhead 24 is a substantially rectangular frame-like member which partitions the vehicle interior 27 and the rear trunk 28. Specifically, the rear bulkhead 24 includes the pair of legs 45 which are respectively joined to the wheel houses 13 provided on both sides in the vehicle width direction, the upper cross member 46 which couples the upper ends 45a of the pair of legs 45 to each other, and the lower cross member 48 which couples the lower ends 45b of the pair of legs 45 to each other.

The upper end 45a of the leg 45 is a portion included in the upper part 32 of the triangular frame 31 In addition, the lower end 45b of the leg 45 is a portion included in the front part 33 of the triangular frame 31.

The upper cross member 46 is formed in a substantially rectangular closed cross-section, and is coupled to the upper ends 45a of the pair of legs 45 and coupled to the upper ends 13a of the pair of wheel houses 13. A rear parcel 52 is integrally provided from the upper cross member 46 toward the rear of the vehicle body, and the vehicle interior 27 and the rear trunk 28 are separated from each other by the rear parcel 52.

The lower cross member 48 is coupled to the lower ends 45b of the pair of legs 45 (that is, the front part 33 of the pair of triangular frames 31. In this state, the lower cross member 48 is provided below the upper cross member 46 and ahead of the upper cross member 46 on the front of the vehicle body.

The rear bulkhead 24 is formed in an annular shape (more specifically, in a rectangular frame shape) by the pair of legs 45, the upper cross member 46, and the lower cross member 48. The pair of legs 45, the upper cross member 46, and the lower cross member 48 are respectively frame members having high rigidity. Therefore, the annular frame of the vehicle rear body structure 10 is formed by the rear bulkhead 24.

The rear bulkhead 24 is formed in the annular shape, and thus a bulkhead opening (opening) 51 is formed inside the rear bulkhead 24.

Herein, the upper end 45a of the left leg 45 intersects with the left end 47 of the upper cross member 46, thereby forming a left upper corner 53. Similarly, the upper end 45a of the right leg 45 intersects with the right end 47 of the upper cross member 46, thereby forming a right upper corner 53.

Further, the lower end 45b of the left leg 45 (that is, the front part 33 of the triangular frame 31) intersects with the left end 49 of the lower cross member 48, thereby forming a left lower corner 54. Similarly, the lower end 45b of the right leg 45 (that is, the front part 33 of the triangular frame 31) intersects with the right end 49 of the lower cross member 48, thereby forming a right lower corner 54.

In this state, a load F1 input from the left damper 16 is transmitted to the left leg 45, and thus is transmitted from the left leg 45 to the left upper corner 53 or the left lower corner 54. Similarly, a load input from the right damper 16 (see FIG. 2) is transmitted to the right leg 45, and thus is transmitted from the right leg 45 to the right upper corner 53 or the right lower corner 54.

For this reason, it is considered that stress concentrates on the left upper corner 53, the left lower corner 54, the right upper corner 53, and the right lower corner 54.

Therefore, a left flange joint portion 56 protruded toward the left upper corner 53 and the left lower corner 54. Similarly, a right flange joint portion 56 protrudes toward the right upper corner 53 and the right lower corner 54.

The left flange joint portion 56 and the right flange joint portion 56 are bilaterally symmetrical to each other. Hereinafter, the left flange joint portion 56 will be described with reference to FIGS. 4 to 8, and the right flange joint portion 56 will not be described.

In addition, the left leg 45, the left upper corner 53, the left lower corner 54, and the left flange joint portion 56 will be described as a leg 45, an upper corner 53, a lower corner 54, and a flange joint portion 56, respectively.

Figure 4:
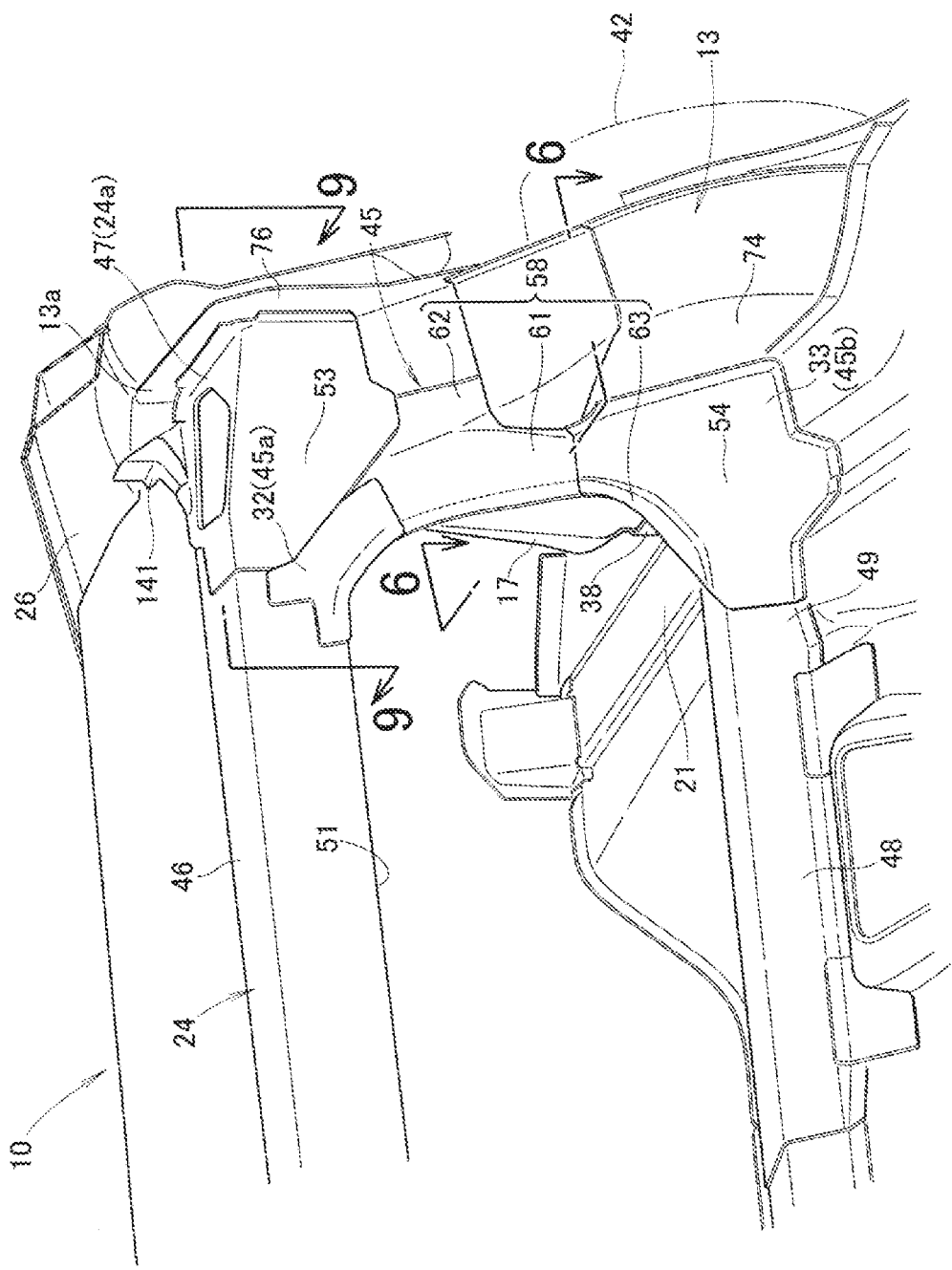
FIG. 4 is an enlarged view of section 4 in FIG. 1.
Figure 5:
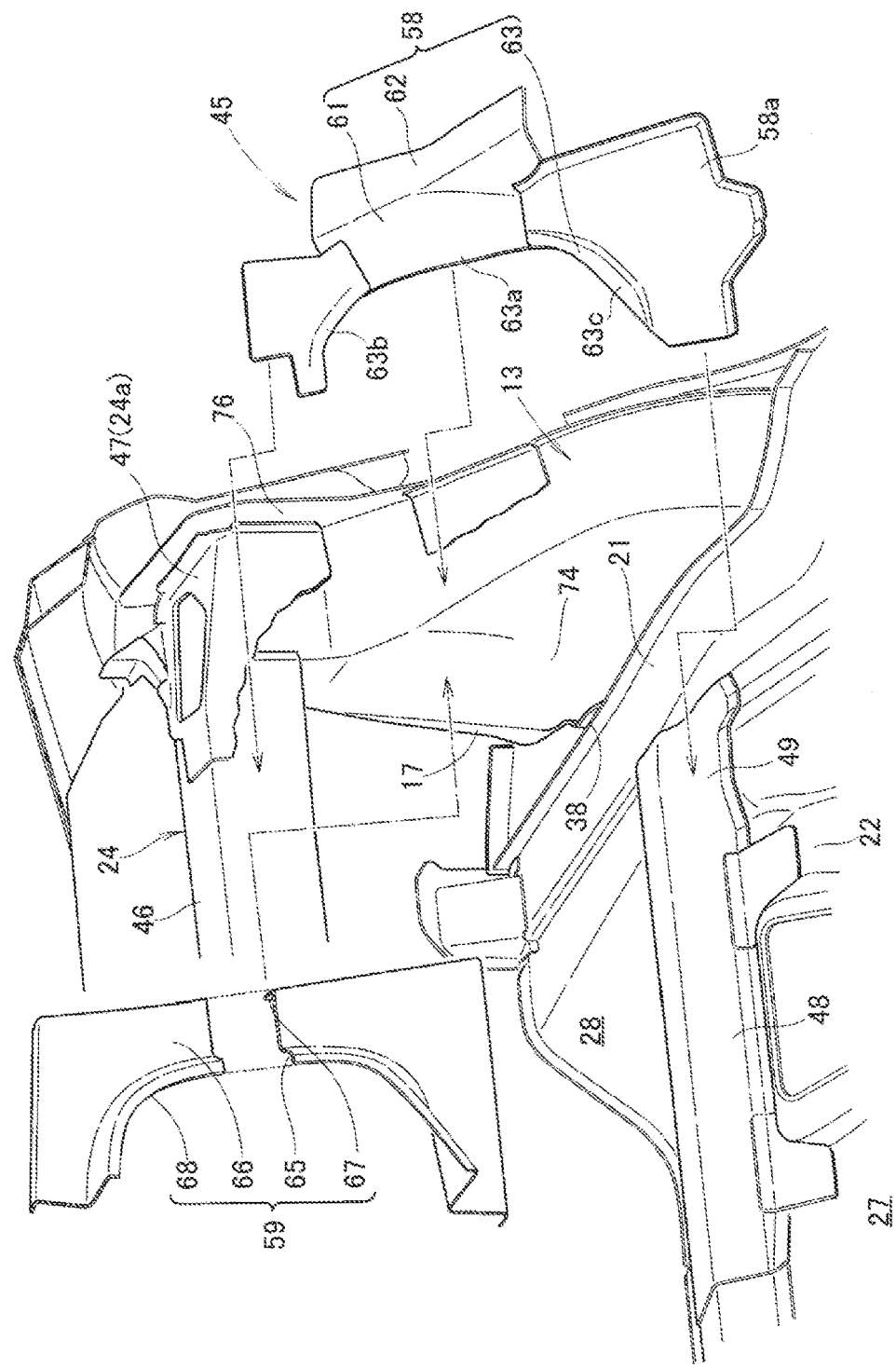
FIG. 5 is an exploded perspective view illustrating the vehicle rear body structure in FIG. 4.

As illustrated in FIGS. 4 and 5, the leg 45 has an outer part joined to the wheel house 13 and is inclined gradually downward to the front of the vehicle body from the upper end 45a to the lower end 45b. In this state, the upper end 45a of the leg 45 is joined to the left end 47 of the upper cross member 46. Further, the lower end 45b of the leg 45 (the front part 33 of the triangular frame 31) is joined to the rear frame 21 and the left end 49 of the lower cross member 48.

Figure 6:
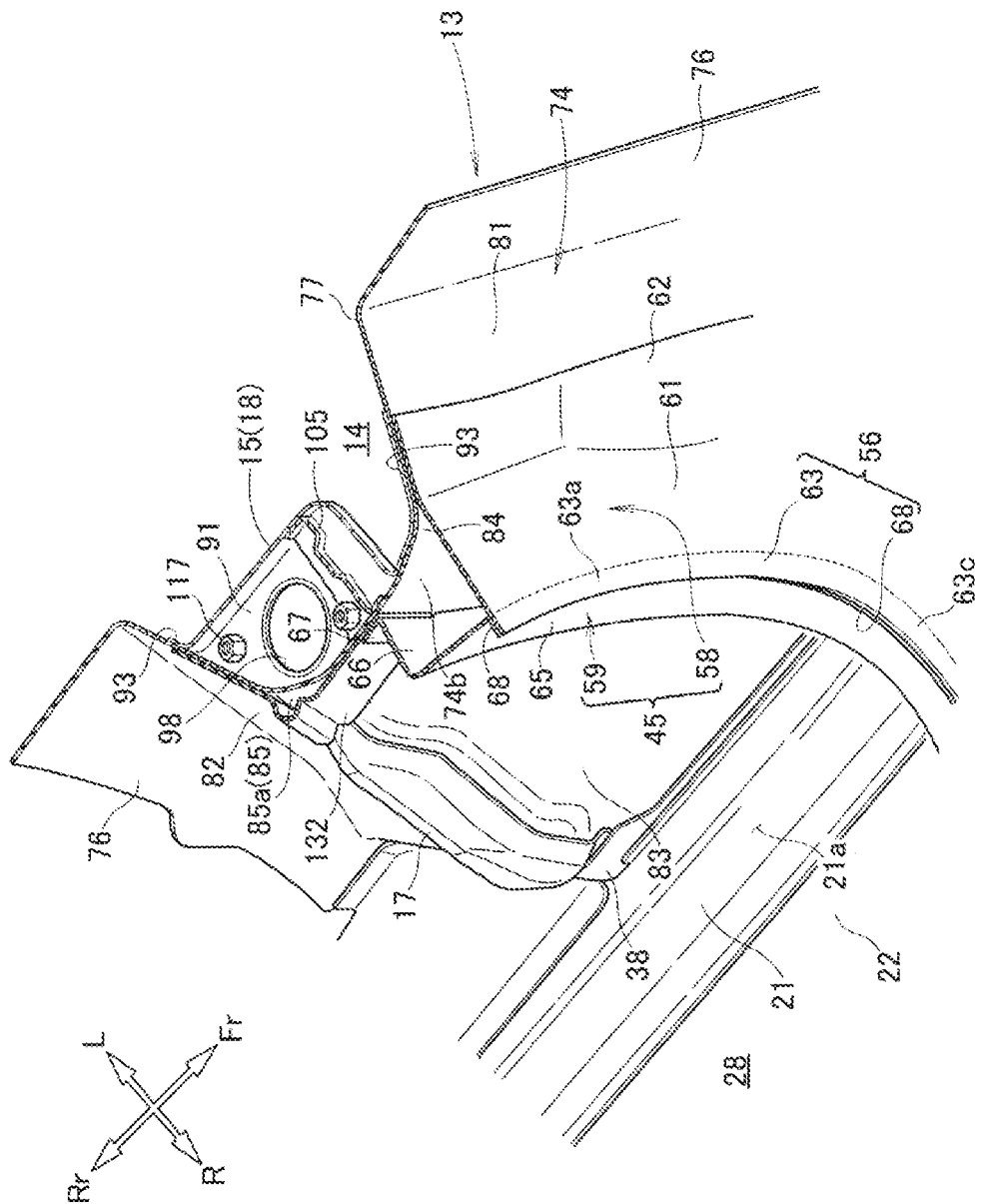
FIG. 6 is a sectional view illustrating a state of being taken along line 6-6 in FIG. 4.

As illustrated in FIGS. 5 and 6, the leg 45 includes a front plate portion 58 joined to the wheel house 13 and a rear plate portion 59 which is disposed behind the front plate portion 58 in the vehicle body and is joined to the wheel house 13.

The front plate portion 58 is a plate member having substantially a flat shape formed by three members of a central member, an upper plate member, and a lower plate member. The front plate portion 58 includes a front leg wall 61 facing the front of the vehicle body, an outer joint portion 62 protruding outward in the vehicle width direction from the front leg wall 61, and a front flange 63 protruding from the front leg wall 61 to the bulkhead opening 51.

The outer joint portion 62 of the front plate portion 58 is joined to the wheel house 13 (specifically, the house peripheral wall 74), and thus the front leg wall 61 is disposed to face the front of the vehicle body.

The front flange 63 has a central part 63a extending linearly, an upper curved part 63b extending curvedly upward from the central part 63a, and a lower curved part 63c extending curvedly downward from the central part 63a.

The upper curved part 63b is a part corresponding to the upper corner 53 (see FIG. 4), and is formed in a concave curved shape. The lower curved part 63c is a part corresponding to the corner 54 (see FIG. 4), and is formed a concave curved shape.

The front flange 63 is formed in a substantially U-shape by the central part 63a, the upper curved part 63b, and the lower curved part 63c.

The rear plate portion 59 is provided behind the front plate portion 58 in the vehicle body. The rear plate portion 59 is disposed behind the front plate portion 58 in the vehicle body and includes an inner leg wall 65 and a rear leg wall 66 which are formed in a substantially L-shaped cross section, an outer joint portion 67 protruding to the rear the vehicle body from the rear leg wall 66, and a rear flange 68 protruding to the bulkhead opening 51 from the inner leg wall 65.

After the outer joint portion 62 of the rear plate portion 59 is joined to the house peripheral wall 74 of the wheel house 13, the flange 68 is joined to the front flange 63 from the rear side of the vehicle body. The rear leg wall 66 is disposed at a distance behind the front leg wall 61 in the vehicle body, and extends in a vertical direction along the front leg wall 61.

Further, the inner leg wall 65 is disposed at a distance on the inner side in the vehicle width direction of the wheel house 13 (specifically, the house peripheral wall 74), and extends in a substantially U-shape along the front flange 63.

Similarly to the front flange 63, the rear flange 68 has a central part 63a extending linearly, an upper curved part 63b extending curvedly upward from the central part 63a, and a lower curved part 63c extending curvedly downward from the central part 63a.

The rear flange 68 is formed in a substantially U-shape by the central part 63a, the upper curved part 63b, and the lower curved part 63c according to the front flange 63. The front flange 63 and the rear flange 68 are joined to each other, and thus the flange joint portion 56 is formed by the front flange 63 and the rear flange 68.

Returning to FIG. 4, the flange joint portion 56 protrudes toward the bulkhead opening 51 and extends from the upper corner 53 to the lower corner 54, thereby being formed in the substantially U-shape. In other words, the flange joint portion 56 extends so as to go around the upper corner 53 and the lower corner 54. Therefore, the upper corner 53 and the lower corner 54 are reinforced by the flange joint portion 56, and the rigidity of the upper corner 53 and the lower corner 54 increases.

Accordingly, the load transmitted from the left damper 16 to the upper corner 53 can be supported by the flange joint portion 56 of the upper corner 53. Further, the load transmitted from the left damper 16 to the lower corner 54 can be supported by the flange joint portion 56 of the lower corner 54.

Therefore, it is not necessary to increase the thickness of the front plate portion 58 and the rear plate portion 59 more than needs for the purpose of the rigidity of the upper corner 53 and the lower corner 54, and an increase in vehicle weight is suppressed.

Figure 7:
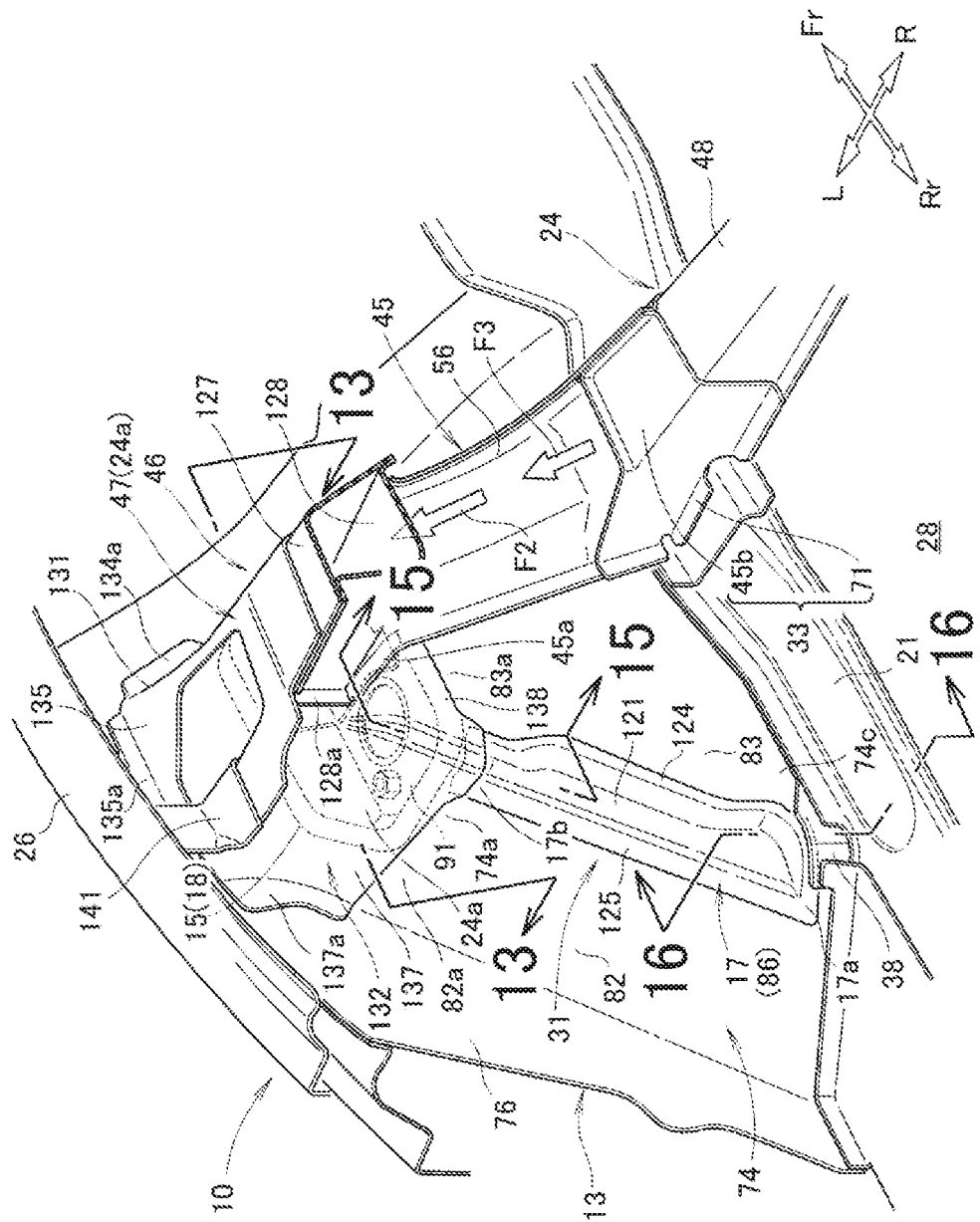
FIG. 7 is an enlarged view of section 7 in FIG. 2.

As illustrated in FIGS. 3 and 7, when the load F1 is input from the damper 16 to the damper base 15, a load F2 is transmitted upward to the leg 45. The load F2 is transmitted to the leg 45, and thus a tensile load F3 acts on the lower end 45b of the leg 45 and the joint portion 71. The joint portion 71 is a portion to which the lower end 45b and the rear frame 21 are joined.

The lower end 45b of the leg 45 and the joint portion 71 are portions included in the front part 33 of the triangular frame 31.

Figure 8:
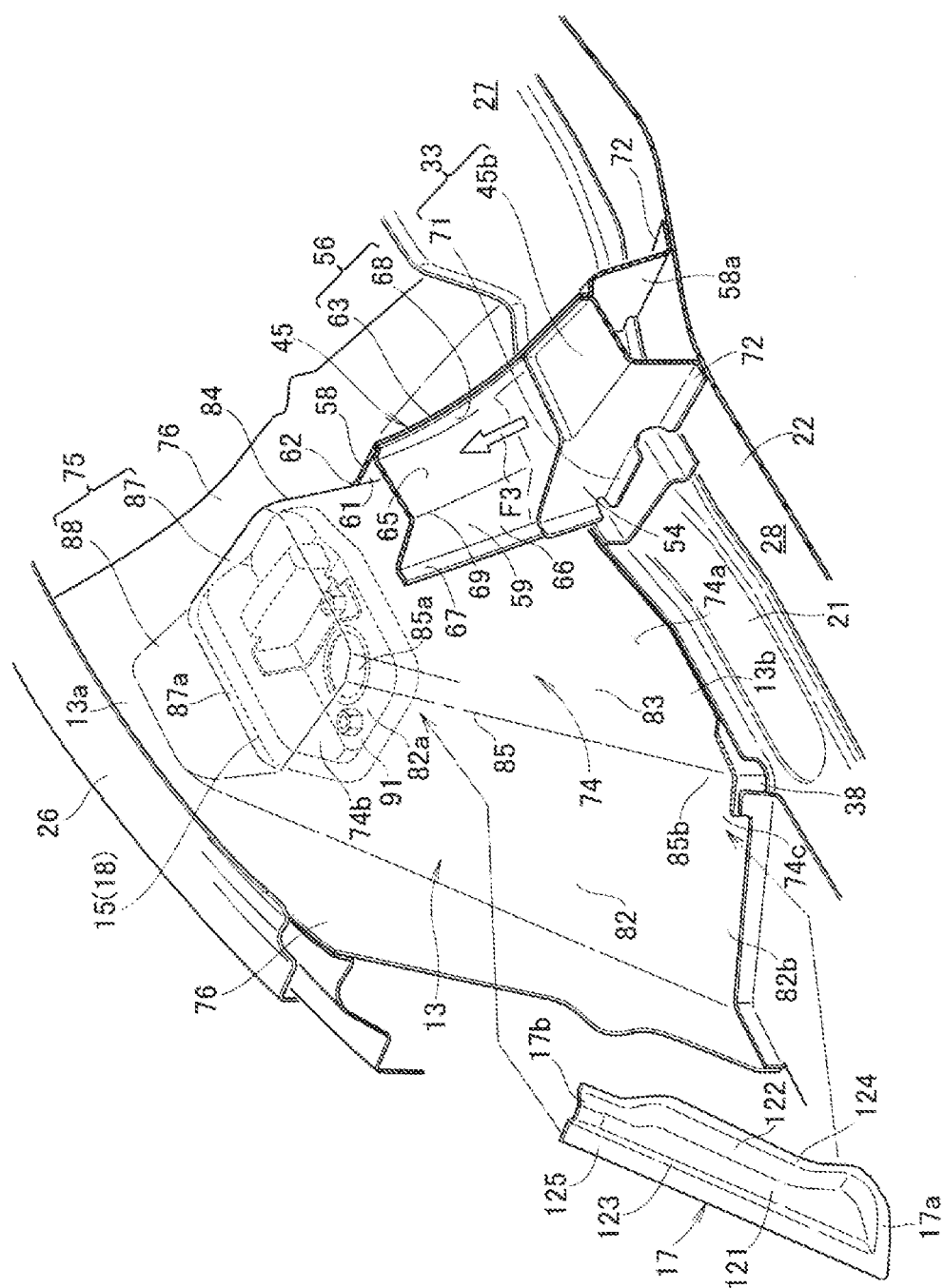
FIG. 8 is a perspective view illustrating a wheel house and a damper base in FIG. 7.

As illustrated in FIG. 8, in consideration of the fact that the tensile load F3 acts on the lower end 45b of the leg 45 and the joint portion 71, the lower end 45b of the leg 45 is joined to the rear frame 21 with the joint portion 71. Further, the lower end 45b of the leg 45 is joined to the floor panel 22 with the joint portion 72.

Therefore, the lower end 45b of the leg 45 is firmly coupled to the rear frame 21. Thus, the tensile load F3 transmitted to the leg 45 is transmitted to the rear frame 21 and suitably supported by the rear frame 21.

Particularly, in a state where the tensile load F3 is transmitted to the leg 45, the tensile load F3 is transmitted to the lower end 45b of the leg 45 through the flange joint portion 56. The flange joint portion 56 is curved and deformed toward the inner side (that is, the vehicle interior 27 and the rear trunk 28) in the vehicle width direction at the lower corner 54.

For this reason, the tensile load F3 acting on the lower end 45b of the leg 45 is transmitted toward the floor panel 22 through the flange joint portion 56 and the lower end 58a of the front plate portion 58.

Therefore, the lower end 58a of the front plate portion 58 is joined to the floor panel 22 with the joint portion 72. Thus, the tensile load F2 transmitted to the leg 45 is transmitted to the rear frame 21 and can be suitably supported by the rear frame 21.

Here, the leg 45 is joined to the house peripheral wall 74 of the wheel house 13, and is formed in a closed cross-section shape together with the house peripheral wall 74. Specifically, the outer joint portion 62 of the front plate portion 58 and the outer joint portion 67 of the rear plate portion 59 are joined to the house peripheral wall 74 of the wheel house 13. Further, the front flange 63 and the rear flange 68 are joined to each other.

Therefore, a closed cross-section is formed by the front leg wall 61, the inner leg wall 65, the rear leg wall 66, and the house peripheral wall 74 of the wheel house 13. That is, the closed cross-section is formed by the leg 45 and the house peripheral wall 74, and the rigidity of the leg 45 is enhanced.

Further, the inner leg wall 65 and the rear leg wall 66 are formed in a substantially L-shaped cross section, so that an intersection portion 69 between the inner leg wall 65 and the rear leg wall 66 69 is formed in a ridge-line shape which protrudes outward. Hereinafter, the "intersection portion 69 is referred to as "ridge-line portion 69". The ridge-line portion 69 protrudes outward, and thus the rigidity of the ridge-line portion 69 is increased and the rigidity of the left leg 45 is increased by the ridge-line portion 69.

As illustrated in FIG. 2, the rear cross member 25 is disposed behind the lower cross member 48 in the vehicle body and between the lower end 17a of the left reinforcing leg 17 and the lower end 17a of the right reinforcing leg 17. The lower end 17a of the reinforcing leg 17 is a portion included in the rear part 34 of the triangular frame 31.

The rear cross member 25 extends in the vehicle width direction between left lower end 17a and the right lower end 17a, and is laid across the left rear frame 21 and the right rear frame 21.

Herein, the protruding portion 38 of the rear frame 21 is joined to the lower end 17a of the reinforcing leg 17. Accordingly, the lower end 17a of the left reinforcing leg 17 is coupled to the left rear frame 21. Similarly, the lower end 17a of the right reinforcing leg 17 is coupled to the right rear frame 21.

Thus, the left end 25a of the rear cross member 25 is coupled to the lower end 17a of the left reinforcing leg 17 through the left rear frame 21. In addition, the right end 25a of the rear cross member 25 is coupled to the lower end 17a of the right reinforcing leg 17 through the right rear frame 21.

Returning to FIG. 1, the wheel houses 13 are provided on both sides in the vehicle width direction of the rear bulkhead 24. The left wheel house 13 is a rear wheel house that is joined to the left side of the rear bulkhead 24 and in which the lower end 13b thereof is joined to the left rear frame 21.

The left damper 16 (see FIG. 3) is disposed on the side of the house space 14 of the left wheel house 13. The left rear wheel 42 is supported by the left damper 16, and the left rear wheel 42 is covered with the left wheel house 13.

Similarly to the left wheel house 13, the right wheel house 13 is a rear wheel house that is joined to the right side of the rear bulkhead 24 and in which the lower end 13b thereof is joined to the right rear frame 21. The right damper 16 is disposed on the side of the house space 14 of the right wheel house 13.

The right rear wheel 42 is supported by the right damper 16, and the right wheel 42 is covered with the right wheel house 13.

The left wheel house 13 and the right wheel house 13 are bilaterally symmetric to each other. Hereinafter, the left wheel house 13 will be described and the right wheel house 13 will not be described.

As illustrated in FIGS. 6 and 8, the wheel house 13 includes the house peripheral wall 74 forming a peripheral wall of the wheel house 13, a house top portion 75 for closing an upper end 74b of the house peripheral wall 74, and a house protruding portion 76 protruding outward from the house peripheral wall 74 and the house top portion 75.

Further, the left wheel house 13 has an opening 77 (also see FIG. 6) which is opened toward the outside in the vehicle width direction.

The house peripheral wall 74 is formed in a substantially U-shaped cross section so as to cover the left rear wheel 42 from the side of the vehicle interior 27. Specifically, the house peripheral wall 74 includes a house front wall 81 (see FIG. 6), a house rear wall 82, a house side wall 83, a house front corner ridge 84, and a house rear corner ridge (house corner ridge) 85.

As illustrated in FIG. 3, the house front wall 81 is provided on a front face 42a of the left rear wheel 42 and is disposed such that the surface thereof faces the front of the vehicle body. The house rear wall 82 is disposed behind the house front wall 81 in the vehicle body.

The house rear wall 82 is provided on the side of the rear face 42b of the left rear wheel 42 and is disposed such that the surface faces the rear of the vehicle body. The house rear wall 82 is inclined gradually downward to rear of the vehicle body from the upper end 82a to the lower end 82b (also see FIG. 8) toward the left rear frame 21.

Returning to FIGS. 6 and 8, the house side wall 83 is formed between an inner part of the house front wall 81 and an inner part of the house rear wall 82. The house side wall 83 extends in the front-and-rear direction of the vehicle body, and is disposed such that the surface thereof faces the rear trunk 28 (that is, the inner side in the vehicle width direction).

The house rear corner ridge 85 is formed at a position where the rear end of the house side wall 83 intersects with an outer part of the house rear wall 82. The house rear corner ridge 85 protrudes inward in the vehicle width direction to be formed in a ridge-line shape having high rigidity. The house rear corner ridge 85 extends from the upper end 85a on the side of the house top portion 75 to the lower end 85b toward the left rear frame 21 so as to be inclined gradually downward to the rear of the vehicle body.

In addition, the house front corner ridge 84 is formed at a position where the front end of the house side wall 83 intersects with the outer part of the house front wall 81. Similarly to the house rear corner ridge 85, the house front corner ridge 84 protrudes inward in the vehicle width direction to be formed in a ridge-line shape having high rigidity.

Figure 10:
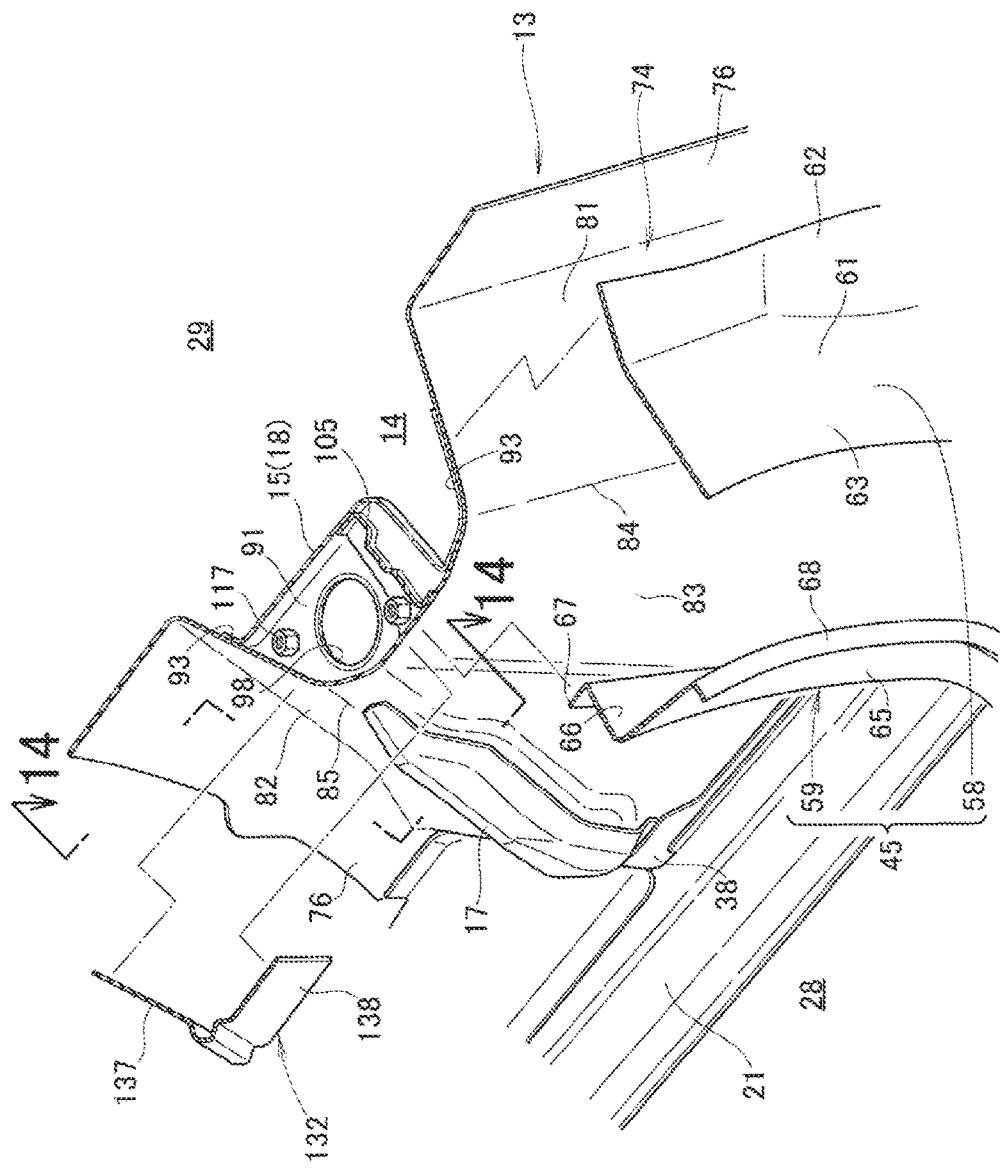
FIG. 10 is an exploded perspective view illustrating the vehicle rear body structure in FIG. 6.

The house peripheral wall 74 is formed in a substantially U-shaped cross section by the house front wall 81, the house front corner ridge 84, the house side wall 83, the house rear corner ridge 85, and the house rear wall 82 (also see FIG. 10). The house top portion 75 is formed at the upper end 74b of the house peripheral wall 74.

Figure 9:
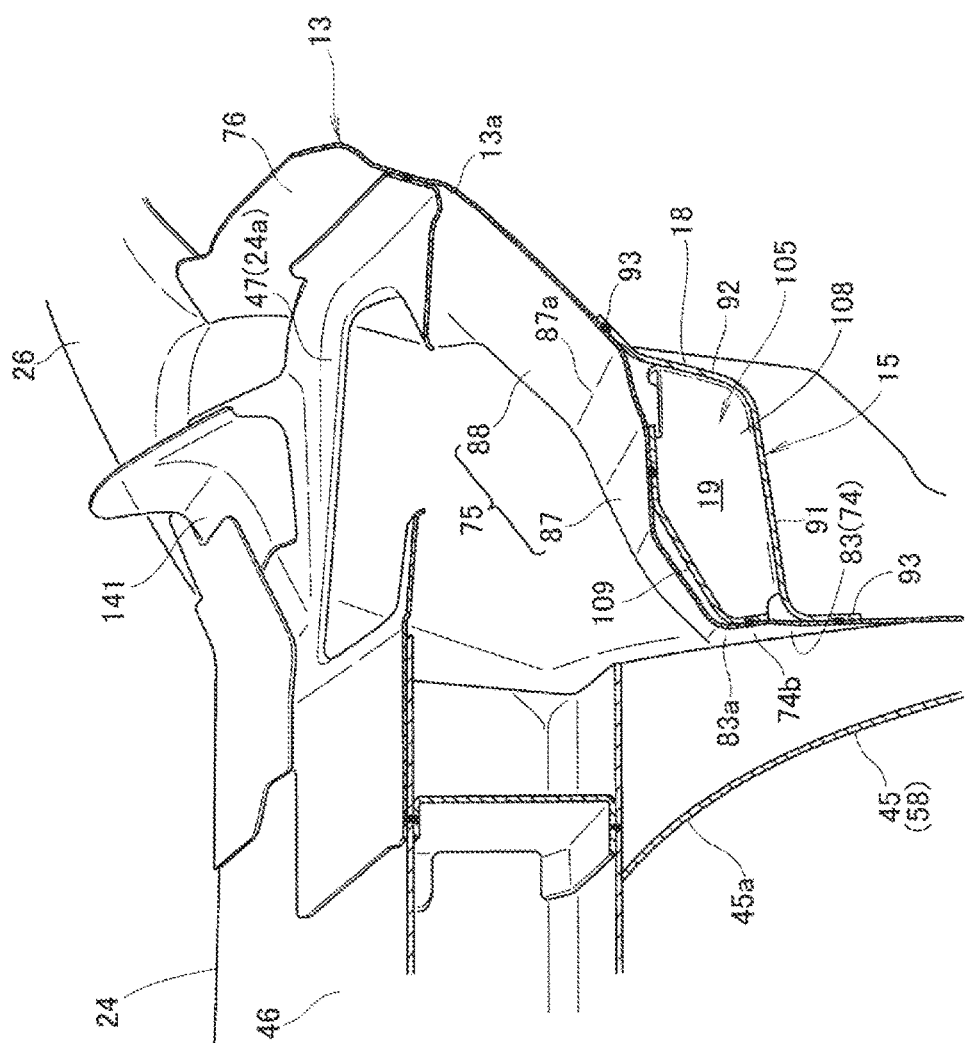
FIG. 9 is a sectional view illustrating a state of being taken along line 9-9 in FIG. 4.

As illustrated in FIGS. 8 and 9, the house top portion 75 is formed at the upper end 74b of the house peripheral wall 74, and thus the upper end 74b of the house peripheral wall 74 is closed by the house top portion 75.

The house top portion 75 includes a horizontal top portion 87 formed in a substantially horizontal direction and an inclined top portion 88 extending gradually upward from an outer part 87a of the horizontal top portion 87 toward the outside in the vehicle width direction.

As illustrated in FIG. 10, the house peripheral wall 74 of the wheel house 13 is formed in the substantially U-shaped cross section, and thus the house space 14 is formed on the side of the vehicle exterior 29 of the wheel house 13. The house space 14 is partitioned from the rear trunk 28 by the wheel house 13. The damper 16 and the rear wheel 42 (see FIG. 3) are disposed on the side of the house space 14.

Figure 11:
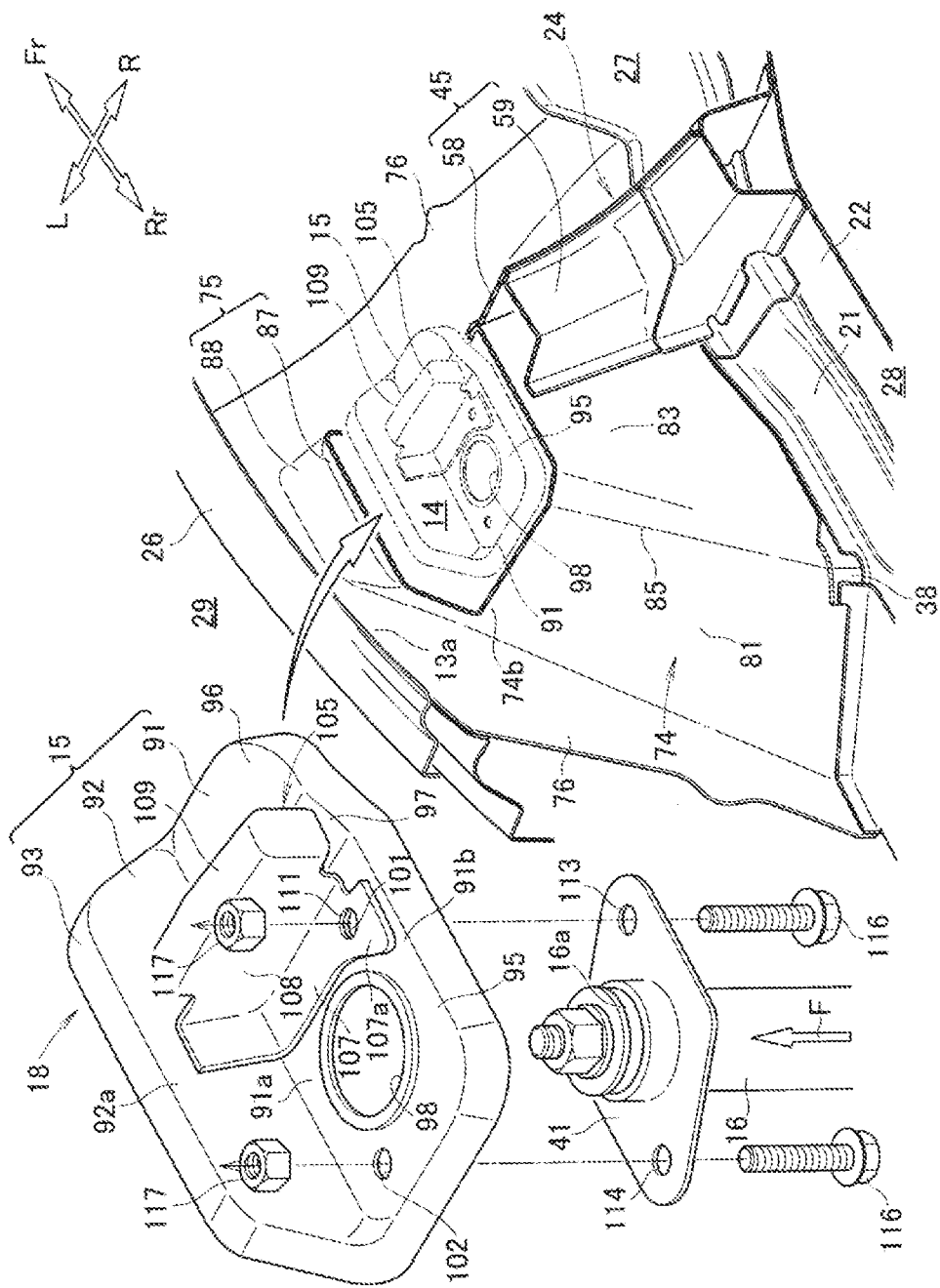
FIG. 11 is a perspective view illustrating a state where the damper base is removed from the wheel house in FIG. 8.
Figure 12:
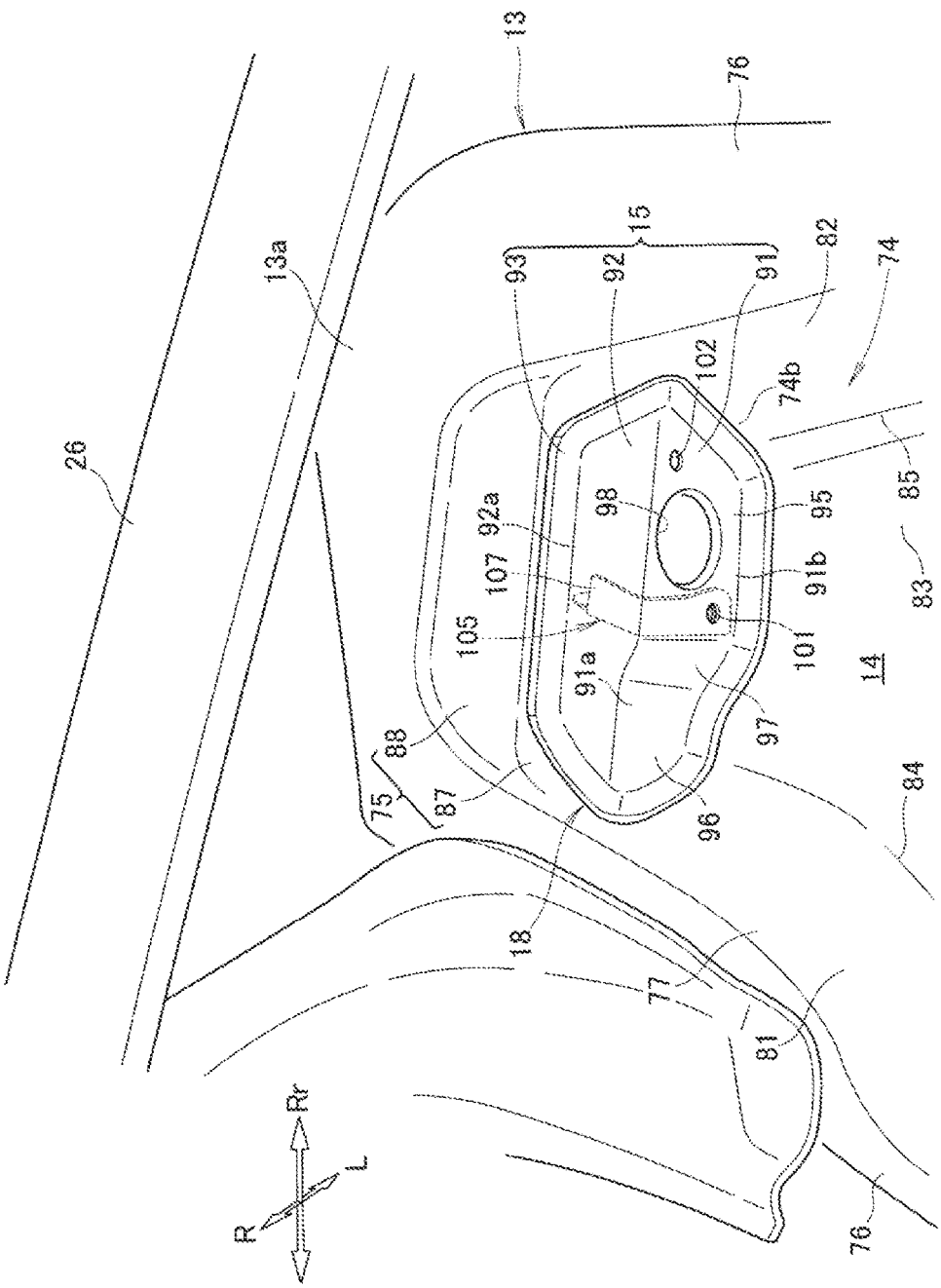
FIG. 12 is an enlarged view of part 12 in FIG. 3.

As illustrated in FIGS. 11 and 12, the damper base 15 is provided in the house space 14 on the side of the vehicle exterior 29 of the wheel house 13, and is provided on the side of the vehicle exterior 29 of the rear bulkhead 24. The damper base 15 includes a damper attaching portion 91 disposed below the house top portion 75 in the house space 14, a support wall 92 rising upward from the damper attaching portion 91, and a peripheral-edge flange 93 formed along the damper attaching portion 91 and the support wall 92.

The damper attaching portion 91 includes a first flat part 95 disposed substantially parallel to the house top portion 75, a second flat part 96 disposed more upward than the first flat part 95, and an inclined part 97 coupling the first flat part 95 and the second flat part 96. The first flat part 95 of the damper attaching portion 91 is disposed between the house rear corner ridge 85 of the house peripheral wall 74 and the leg 45 in the front-and-rear direction of the vehicle body.

The damper attaching portion 91 is formed in a stepped shape by the first flat part 95, the second flat part 96, and the inclined part 97, and rigidity of the damper attaching portion 91 is secured.

A damper fitting opening 98 is formed substantially at a center of the first flat part 95. Therefore, the damper fitting opening 98 is disposed between house rear corner ridge 85 of the house peripheral wall 74 and the leg 45 in the front-and-rear direction of the vehicle body.

Further, the first flat part 95 is formed with a front attachment hole 101 and a rear attachment hole 102 in the vicinity of the peripheral edge of the damper fitting opening 98. The front attachment hole 101 is positioned inward in the vehicle width direction on the front of the vehicle body. The rear attachment hole 102 is positioned outward in the vehicle width direction on the rear of vehicle body.

The support wall 92 rises upward from an outer part 91a of the damper attaching portion 91 toward the house top portion 75. The outer part 91a of the damper attaching portion 91 is a side part of the damper attaching portion 91 on the side of the opening 77 (in other words, on the side opposite to the house side wall 83) of the wheel house 13.

The support wall 92 rises upward from the outer part 91a of the damper attaching portion 91, and thus the damper base 15 is formed in a substantially L-shaped cross section by the damper attaching portion 91 and the support wall 92. Thus, the damper attaching portion 91 is reinforced by the support wall 92, and the rigidity of the damper attaching portion 91 is further secured.

The peripheral-edge flange 93 is formed in an endless shape (in other words, an annular shape) along an outer periphery 91b of the damper attaching portion 91 and an outer periphery 92a of the support wall 92. The peripheral-edge flange 93 is joined to an inner surface of the upper end 74*b* of the house peripheral wall 74 and an inner surface of the house top portion 75.

For this reason, the damper supporting portion 18 is formed by the damper base 15, the upper end 74*b* of the house peripheral wall 74, and the house top portion 75. Herein, the peripheral-edge flange 93 is joined to the inner surface of the upper end 74*b* of the house peripheral wall 74 and the inner surface of the house top portion 75, and thus the entire periphery of the damper base 15 is kept in a closed state.

Figure 13:
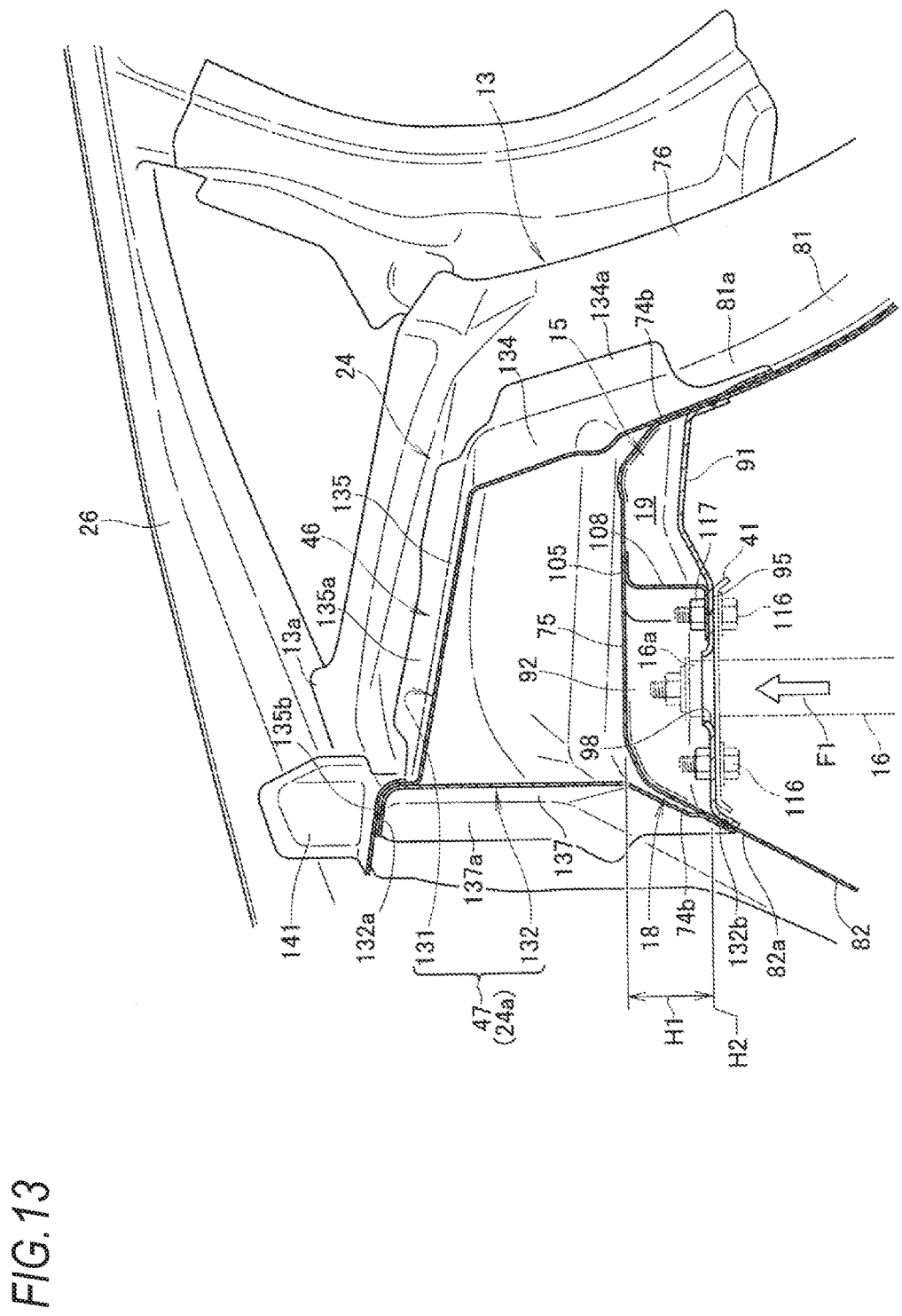
FIG. 13 is a sectional view illustrating a state of being taken along line 13-13 in FIG. 7.

Thus, the damper supporting portion 18 is formed in a bag shape (box shape) by the damper base 15, the upper end 74*b* of the house peripheral wall 74, and the house top portion 75 (also see FIGS. 9 and 13). The damper supporting portion 18 is formed in the bag shape, and thus the rigidity of the damper supporting portion 18 is increased.

In this manner, simply by joining the peripheral-edge flange 93 of the damper base 15 to the inner surface of the wheel house 13, it is possible to easily form the damper supporting portion 18 having high rigidity, and the configuration can be simplified.

In the interior 19 (see FIGS. 9 and 13) of the damper supporting portion 18, a bulkhead 105 is provided substantially at the center in the front-and-rear direction of the vehicle body. The bulkhead 105 includes a lower flange (lower end) 107 joined to the damper attaching portion 91 and the support wall 92, a standing wall 108 rising upward from the lower flange 107, and an upper flange (upper end) 109 protruding to the front of the vehicle body from the upper end of the standing wall 108. The upper flange 109 is joined to the house top portion 75.

In this manner, the bulkhead 105 is provided in the interior 19 of the damper supporting portion 18, and thus the rigidity of the damper supporting portion 18 is further secured by the bulkhead 105.

Herein, an attachment hole 111 is formed in an inner end 107*a* of the lower flange 107. The attachment hole 111 of the lower flange 107 is disposed at a position corresponding to the front attachment hole 101 of the damper attaching portion 91. Using the attachment hole 111, the front attachment hole 101, and the rear attachment hole 102, the attachment bracket 41 of the damper 16 is attached to the damper supporting portion 18 (see FIG. 13).

Specifically, the front attachment hole 113 and the rear attachment hole 114 are formed in the attachment bracket 41 of the damper 16. A bolt 116 is inserted into the front attachment hole 113 of the attachment bracket 41, the front attachment hole 101 of the first flat part 95, and the attachment hole 111 of the lower flange 107, and a nut 117 is screwed to the bolt 116.

Similarly, a bolt 116 is inserted into a rear attachment hole 114 of the attachment bracket 41 and a rear attachment hole 102 of the first flat part 95, and a nut 117 is screwed to the bolt 116. The bolt 116 and the nut 117 are fastening portions.

As illustrated in FIG. 13, the upper part 16*a* of the left damper 16 is fitted to the damper fitting opening 98, and the attachment bracket 41 of the left damper 16 is fastened to the first flat part 95 (that is, the damper attaching portion 91). Accordingly, the damper 16 is coupled to the damper supporting portion 18 having high rigidity, and is disposed on the side of the vehicle exterior 29 of the wheel house 13.

In this state, the attachment bracket 41 of the damper 16 is disposed between the house rear corner ridge 85 (see FIG. 11) of the house peripheral wall 74 and the leg 45 in the front-and-rear direction of the vehicle body.

The damper 16 is coupled to the damper supporting portion 18, and thus the load F1 input to the damper attaching portion 91 from the damper 16 can be suitably supported by the bag-like damper supporting portion 18 having high rigidity. Accordingly, there is no need to increase the plate thickness of the damper base 15 to increase the rigidity, and an increase in vehicle weight can be suppressed.

Returning to FIG. 11, the bolt 116 is inserted into the front attachment hole 113 of the attachment bracket 41, the front attachment hole 101 of the first flat part 95, and the attachment hole 111 of the lower flange 107, and the nut 117 is screwed to the bolt 116.

That is, the lower flange 107 of the bulkhead 105 is fastened together with the damper attaching portion 91 by the bolt 116 and nut 117 for attaching the damper 16 to the attachment bracket 41. Therefore, the load F1 input from the damper 16 to the damper attaching portion 91 is transmitted to the bulkhead 105 through the bolt 116 and the nut 117.

Here, the lower flange 107 of the bulkhead 105 is joined to the damper attaching portion 91 and the support wall 92. In addition, the upper flange 109 of the bulkhead 105 is joined to the house top portion 75.

Thus, the load input from the damper 16 to the damper attaching portion 91 (that is, the damper base 15) is transmitted to the support wall 92 and the house top portion 75 through the bulkhead 105 Accordingly, the load F1 input from the damper 16 to the damper base 15 can be suitably supported by the damper supporting portion 18, and deformation of the damper attaching portion 91 can be suppressed.

Returning to FIG. 13, a height H2 of the damper attaching portion 91 is adjusted by a change of a height H1 of the support wall 92 in the damper supporting portion 18. Therefore, the height H1 of the support wall 92 is changed, and thus the height of the damper attaching portion 91 can be adjusted depending on the height dimensions (that is, length dimensions) of various types of dampers 16.

This makes it possible to adjust the damper supporting portion 18 to various types of dampers 16 and to expand the use of the damper supporting portion 18.

As illustrated in FIGS. 6 and 9, the damper supporting portion 18 is coupled to the upper end 45*a* of the rear bulkhead 24 (specifically, the leg 45).

Herein, the damper supporting portion 18 is formed by the damper base 15, the upper end 74*b* of the house peripheral wall 74, and the house top portion 75. In addition, the upper end 45*a* (that is, the upper end of the front plate portion 58 and the upper end of the rear plate portion 59) of the leg 45 is joined to the upper end 74*b* of the house peripheral wall 74. Therefore, the damper base 15 is joined to the upper end 45*a* of the leg 45 through the upper end 74*b* of the house peripheral wall 74.

Further, the upper end 74*b* of the house peripheral wall 74 includes the upper end 85*a* of the house rear corner ridge 85. Accordingly, the damper base 15 is joined to the upper end 85*a* of the house rear corner ridge 85.

Here, as illustrated in FIGS. 7 and 8, the leg 45 is inclined gradually downward to the front of the vehicle body from the upper end 45*a* to the lower end 45*b*. In addition, the house rear corner ridge 85 is inclined gradually downward to the rear of the vehicle body from the upper end 85*a* to the lower end 85*b*.

Accordingly, the house rear corner ridge 85 and the leg 45 extend so that the distance gradually widens from the damper supporting portion 18 to the rear frame 21 in the front-and-rear direction of the vehicle body. That is, the house rear corner ridge 85 and the leg 45 are provided in an inverted V-shape in a side view.

Further, the lower end 45b of the leg 45 of the rear bulkhead 24 is coupled to the rear frame 21. Therefore, the damper supporting portion 18 is coupled to the rear frame 21 through the leg 45.

In addition, the lower end 85b of the house rear corner ridge 85 is coupled to the protruding portion 38 of the rear frame 21. The damper supporting portion 18 is coupled to the rear frame 21 through the house rear corner ridge 85.

In addition, the house rear corner ridge 85, the leg 45, and the rear frame 21 are secured to have high rigidity. For this reason, the damper supporting portion 18 is supported in a stable state by the house rear corner ridge 85, the leg 45, and the rear frame 21.

By the way, when the load F1 (see FIG. 13) is input to the damper 16 from the damper attaching portion 91 (that is, the damper base 15), a relatively large load is transmitted to the house rear corner ridge 85. Therefore, the reinforcing leg 17 is provided across the house rear corner ridge 85 from the outside of the house peripheral wall 74. The reinforcing leg 17 extends in the vertical direction along the house rear corner ridge 85.

Figure 14:
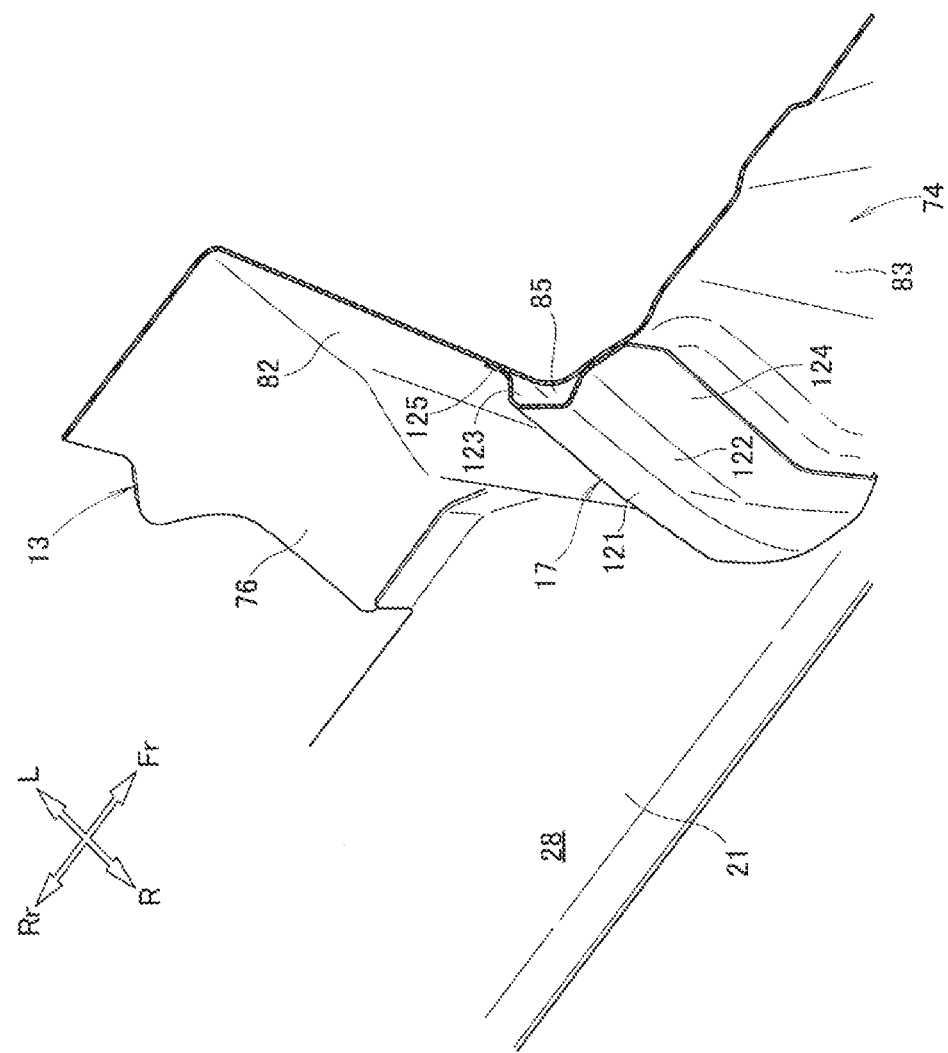
FIG. 14 is a sectional view illustrating a state of being taken along line 14-14 in FIG. 10.

As illustrated in FIGS. 8 and 14, the reinforcing leg 17 includes a top portion 121 facing the house rear corner ridge 85, an inner wall 122 and an outer wall 123 formed on the top portion 121, an inner flange 124 formed on the inner wall 122, and an outer flange 125 formed on the outer wall 123.

The inner wall 122 protrudes from an inner end of top portion 121 toward the house side wall 83. The outer wall 123 protrudes from an outer end of the top portion 121 toward the house rear wall 82. The inner flange 124 protrudes from a side end of the inner wall 122 toward the front of the vehicle body along the house side wall 83. The outer flange 125 protrudes outward in the vehicle width direction from a side end of the outer wall 123 along the house rear wall 82.

The top portion 121, the inner wall 122 and the outer wall 123 are formed in a substantially U-shaped cross section. In addition, the reinforcing leg 17 is formed in a substantially hat shape by the top portion 121, the inner wall 122, the outer wall 123, the inner flange 124, and the outer flange 125.

In the state where the top portion 121 faces the house rear corner ridge 85, the inner flange 124 is joined to the house side wall 83 and the outer flange 125 is joined to the house rear wall 82. Further, the upper end 17b of the reinforcing leg 17 is joined to the upper end 74b of the house peripheral wall 74. Further, the lower end 17a of the reinforcing leg 17 is joined to a lower end 74c of the house peripheral wall 74.

Thus, the reinforcing leg 17 is joined to the house peripheral wall 74 across the house rear corner ridge 85. In this state, the reinforcing leg 17 extends upward toward the left end 47 (see FIG. 7) of the rear bulkhead 24 (specifically, the upper cross member 46) along the house rear corner ridge 85 from the rear frame 21.

As illustrated in FIGS. 7 and 13, the upper cross member 46 is formed in a substantially rectangular closed cross section by a front member 127 and a rear member 128. Further, the left end 47 of the upper cross member 46 includes a front bracket 131 extending outward in the vehicle width direction from the front member 127 and a rear bracket 132 which is joined to the front bracket 131 on the rear of the vehicle body.

The left end 47 of the upper cross member 46 is formed in a box shape having substantially an inverted U-shaped cross section by the front bracket 131 and the rear bracket 132.

The front bracket 131 includes a front wall 134 protruding upward from the upper end 81a of the house front wall 81 and a top portion 135 bent from the upper end of the front wall 134 toward the rear of the vehicle body. The front bracket 131 is formed in a substantially V-shaped cross section by the front wall 134 and the top portion 135.

A lower end of the front wall 134 is joined to the upper end 81a of the house front wall 81, and a flange 134a of the front wall 134 is joined to the house protruding portion 76 of the wheel house 13. In addition, a flange 135a of the top portion 135 is joined to the house protruding portion 76.

A rear end 135b of the top portion 135 is joined to the upper end 132a of the rear bracket 132.

The rear bracket 132 includes a rear wall 137 protruding upward from the upper end 82a of the house rear wall 82 and a side wall 138 bent from an inner part of the rear wall 137 toward the front of the vehicle body along the house side wall 83.

A lower end of the rear wall 137 is joined to the upper end 82a of the house rear wall 82, and a flange 137a of the rear wall 137 is joined to the house protruding portion 76 of the wheel house 13. In addition, a lower end of the side wall 138 is joined to the upper end 83a of the house side wall 83, and a front end of the side wall 138 is joined to the upper end 45a of the leg 45 and the rear member 128 of the upper cross member 46.

The lower end of the rear wall 137 is joined to the upper end 82a of the house rear wall 82 and the lower end of the side wall 138 is joined to the upper end 83a of the house side wall 83, and thus the lower end 132b of the rear bracket 132 is joined to the upper end 74b of the house peripheral wall 74.

The front bracket 131 and the rear bracket 132 are formed in a substantially inverted U-shaped cross section, and are joined to the upper end 74b of the house peripheral wall 74. The upper end 74b of the house peripheral wall 74 is a part in which the damper supporting portion 18 is formed. Thus, the damper supporting portion 18 is reinforced by the front bracket 131 and the rear bracket 132.

Figure 15:
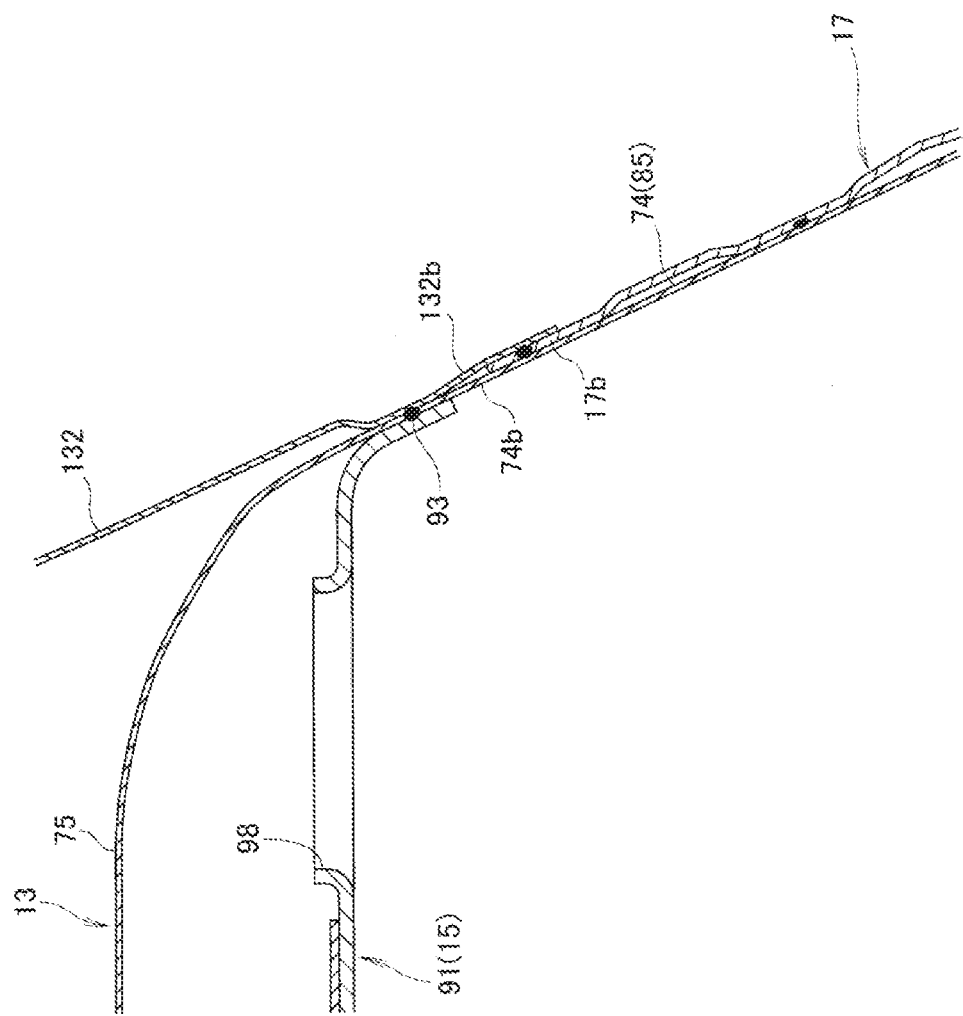
FIG. 15 is a sectional view illustrating a state of being taken along line 15-15 in FIG. 7.

As illustrated in FIGS. 7 and 15, three members of the peripheral-edge flange 93 of the damper base 15 (specifically, the damper attaching portion 91), the upper end 74b of the house peripheral wall 74, and the lower end 132b of the rear bracket 132 are joined to each other in a state of being superimposed.

Here, when a plurality of plates are subjected to welding (specifically, spot welding) in a state of being superimposed, it is usually preferable to suppress the number of plates to be superimposed not to exceed three sheets.

Therefore, three members of the peripheral-edge flange 93 of the damper base 15 (specifically, the damper attaching portion 91), the upper end 74b of the house peripheral wall 74, and the lower end 132b of the rear bracket 132 are subjected to welding (spot welding) in a state of being superimposed.

Thus, it is possible to easily join and weld the three members of the peripheral-edge flange 93, the upper end 74b of the house peripheral wall 74, and the lower end 132b of the rear bracket 132 in the state of being superimposed.

Here, an upper end 24a of the rear bulkhead 24 is formed at the left end 47 of the upper cross member 46. The rear bracket 132 is included in the left end 47 of the upper cross member 46.

Therefore, the damper base 15 is joined to the upper end 24a of the rear bulkhead 24 through the upper end 74b of the house peripheral wall 74.

In addition, the rear bracket 132 (specifically, the front end of the side wall 138) is joined to the upper end 45a of the leg 45 and the left end 128a of the upper cross member 46 (specifically, the rear member 128).

In this state, three members of the upper end 17b of the reinforcing leg 17, the upper end 74b of the house peripheral wall 74, and the lower end 132b of the rear bracket 132 are joined to each other in the state of being superimposed. Thus, it is possible to easily join and weld the three members of the upper end 17b of the reinforcing leg 17, the upper end 74b of the house peripheral wall 74, and the lower end 132b of the rear bracket 132 in the state of being superimposed.

In this way, the three members of the peripheral-edge flange 93 of the damper base 15 (damper attaching portion 91), the upper end 74b of the house peripheral wall 74, and the lower end 132b of the rear bracket 132 are joined to each other in the state of being superimposed. Further, the three members of the upper end 17b of the reinforcing leg 17, the upper end 74b of the house peripheral wall 74, and the lower end 132b of the rear bracket 132 are joined to each other in the state of being superimposed.

Accordingly, the damper base 15 is joined to the reinforcing leg 17 through the upper end 74b of the house peripheral wall 74 and the lower end 132b of the rear bracket 132 (that is, the upper end 24a of the rear bulkhead 24).

In this way, four members of the damper base 15, the upper end 74b of the house peripheral wall 74, the lower end 132b of the rear bracket 132, and the reinforcing leg 17 are not joined to each other in a state of being superimposed by welding (spot welding), and the damper base 15 can be joined to the reinforcing leg 17.

Accordingly, it is possible to easily join the damper base 15 to the reinforcing leg 17.

As illustrated in FIGS. 7 and 16, the lower end 17a of the reinforcing leg 17 is joined to the lower end 74c of the house peripheral wall 74. Further, the protruding portion 38 of the rear frame 21 is joined to the lower end 17a of the reinforcing leg 17. That is, the lower end 17a of the reinforcing leg 17 is joined to the rear frame 21.

In addition, the upper end 17b of the reinforcing leg 17 is joined to the upper end 74b of the house peripheral wall 74. Further, the upper end 17b of the reinforcing leg 17 is joined to the upper end 45a of the leg 45 through the side wall 138 of the rear bracket 132.

In this state, the reinforcing leg 17 is provided across the house rear corner ridge 85 (also see FIG. 8) from the outer side (that is, the side of the rear trunk 28) of the wheel house 13. Accordingly, the rigidity of the house rear corner ridge 85 can be further increased by the reinforcing leg 17, and a relatively large load can be supported by the house rear corner ridge 85 and the reinforcing leg 17.

This makes it possible to support the relatively large load without increasing the thickness of the wheel house 13 more than needs, for example, thereby satisfactorily suppressing an increase in vehicle weight.

Further, the reinforcing leg 17 is joined to the house peripheral wall 74, and the upper end 45a of the leg 45 and the rear frame 21 are coupled to each other by the reinforcing leg 17. Thus, the rigidity of the rear bulkhead 24, the rear frame 21, and the wheel house 13 (that is, the rigidity of the vehicle rear body structure 10) is increased.

Further, the reinforcing leg 17 is provided across the house rear corner ridge 85. Hereinafter, the "reinforcing leg 17 and the house rear corner ridge 85" will be described as a "rear leg 86".

The house rear corner ridge 85 and the leg 45 are provided in an inverted V-shape in a side view, and thus the rear leg 86 and the leg 45 are also provided in an inverted V-shape in a side view.

Therefore, the damper supporting portion 18 is supported in a stable state by the rear leg 86, the leg 45, and the rear frame 21. In this state, the attachment bracket 41 (see FIG. 3) of the damper 16 is disposed between the leg 86 and the leg 45 in the front-and-rear direction of the vehicle body.

In the state where the damper supporting portion 18 is supported by the rear leg 86, the leg 45, and the rear frame 21, the load F1 (see FIG. 3) is transmitted to the damper supporting portion 18 from the damper 16.

The load F1 transmitted to the damper supporting portion 18 is suitably transmitted to the rear frame 21, as a tensile load, through the rear leg 86 and the leg 45. The tensile load transmitted to the rear frame 21 is supported by the rear frame 21.

In addition, the rear bulkhead 24 is a member that is generally used for a vehicle having the vehicle interior 27 and the rear trunk 28. The leg 45 of the rear bulkhead 24 can also be used as a member forming an inverted V-shape.

Thus, there is no need to provide a dedicated member for forming an inverted V-shape, and an increase in vehicle weight can be favorably suppressed.

By the way, as illustrated in FIG. 1, the rear bulkhead 24 is formed in the rectangular frame shape by the left leg 45, the right leg 45, the upper cross member 46, and the lower cross member 48. In addition, each of the members 45, 45, 46, and 48 is formed in the closed cross-section and has a ridge-like part.

Therefore, the load transmitted to the leg 45 is transmitted to the rear bulkhead 24 (specifically, the ridge-like part) having the rectangular frame shape, and the load can be supported by the rear bulkhead 24. Thus, it is possible to suppress, for example, torsional deformation in the vehicle rear body structure 10 (specifically, torsional deformation in the vertical direction of the vehicle rear body structure 10) due to the load F1 input to the damper supporting portion 18 from the damper 16 (see FIG. 3), and to improve steering stability.

As illustrated in FIGS. 7 and 13, a coupling brace 141 rises from the top portion 135 of the left end 47 of the upper cross member 46 toward the rear pillar 26. Therefore, the left end 47 of the upper cross member 46 is coupled to the rear pillar 26 by the coupling brace 141.

Thus, when the load F1 is transmitted from the damper 16 to the damper supporting portion 18, the transmitted load F1 is transmitted to the rear pillar 26 through the left end 47 of the upper cross member 46 and the coupling brace 141.

Here, the rear pillar 26 is a member that is formed in the closed cross-section and has high rigidity. Accordingly, the load transmitted to the real pillar 26 from the coupling brace 141 is suitably supported by the rear pillar 26.

This makes it possible to support the load F1 transmitted to the damper supporting portion 18 from the damper 16 without suppressing the plate thickness of the damper supporting portion 18 (specifically, the damper base 15).

Returning to FIGS. 1 and 3, the sub-frame 23 is provided below the left rear frame 21 and the right rear frame 21. Specifically, a left front attachment portion 147 of the sub-frame 23 is coupled to a front attachment portion 144 of the left rear frame 21 with a bolt 151. In addition, a left rear attachment portion 148 of the sub-frame 23 is coupled to a rear attachment portion 145 of the left rear frame 21 with a bolt 151.

Similarly, a right front attachment portion 147 of the sub-frame 23 is coupled to a front attachment portion 144 of the right rear frame 21 with a bolt 151. In addition, a right rear attachment portion 148 of the sub-frame 23 is coupled to a rear attachment portion 145 of the right rear frame 21 with a bolt 151.

In the state where the sub-frame 23 is provided on the left rear frame 21 and the right rear frame 21, the left damper 16 is supported on the left side of the sub-frame 23. Similarly, the right damper 16 is supported on the right side of the sub-frame 23.

A load input from the left damper 16 to the left side of the sub-frame 23 is transmitted, as a load F4 and a load F5, to the front attachment portion 144 and the rear attachment portion 145 of the left rear frame 21. Similarly, a load input from the right damper 16 to the right side of the sub-frame 23 is transmitted, as a load F6 and a load F7, to the front attachment portion 144 and the rear attachment portion 145 of the right rear frame 21.

Here, the front attachment portion 144 and the rear attachment portion 145 of the left rear frame 21 is provided at positions adjacent to the front part 33 and the rear part 34 of the left triangular frame 31. Further, the front attachment portion 144 and the rear attachment portion 145 of the right rear frame 21 are provided at positions adjacent to the front part 33 and the rear part 34 of the right triangular frame 31.

As illustrated in FIG. 2, the left triangular frame 31 is formed to have high rigidity by the left rear frame 21, the left rear leg 86, and the left leg 45. Similarly, the right triangular frame 31 is formed to have high rigidity by the right rear frame 21, the right rear leg 86, and the right leg 45.

Further, the left triangular frame 31 and the right triangular frame 31 are coupled to each other by the upper cross member 46 of the rear bulkhead 24, the lower cross member 48 of the rear bulkhead 24, and the rear cross member 25, so that the triangular prism frame body 35 is formed. The triangular prism frame body 35 is a portion having high rigidity.

In addition, the left damper supporting portion 18 is provided on the upper part 32 of the left triangular frame 31. Further, the right damper supporting portion 18 is provided on the upper part 32 of the right triangular frame 31.

The left damper supporting portion 18 and the right damper supporting portion 18 are portions that are formed in the bag shape and have high rigidity. Therefore, the triangular prism frame body 35 is reinforced by the left damper supporting portion 18 and the right damper supporting portion 18.

When the triangular prism frame body 35 is reinforced by the left damper supporting portion 18 and the right damper supporting portion 18, it is possible to increase rigidity while suppressing an increase in weight of the vehicle rear body structure 10.

Thus, the loads F4 and F5, which are transmitted from the left side of the sub-frame 23 (see FIG. 3) to the front attachment portion 144 and the rear attachment portion 145 of the left rear frame 21, can be supported by the left triangular frame 31 and the triangular prism frame body 35.

Similarly, the loads F6 and F7, which are transmitted from the right side of the sub-frame 23 to the front attachment portion 144 and the rear attachment portion 145 of the left rear frame 21, can be supported by the right triangular frame 31 and the triangular prism frame body 35.

In addition, the left damper supporting portion 18 is provided on the upper part 32 of the left triangular frame 31, and the right damper supporting portion 18 is provided on the upper part 32 of the right triangular frame 31. Accordingly, the triangular prism frame body 35 is reinforced by the left damper supporting portion 18 and the right damper supporting portion 18.

Thus, the load F1 (see FIG. 3) transmitted from the left damper 16 to the left damper supporting portion 18 and the load F1 transmitted from the right damper 16 to the right damper supporting portion 18 can be favorably supported by the triangular prism frame body 35.

Next, an example will be described with reference to FIGS. 17A and 17B and FIGS. 18A and 18B in which a load F8 input from the damper 16 to the damper base 15 is supported by the damper supporting portion 18 and the rear frame 21.

Figure 17A:
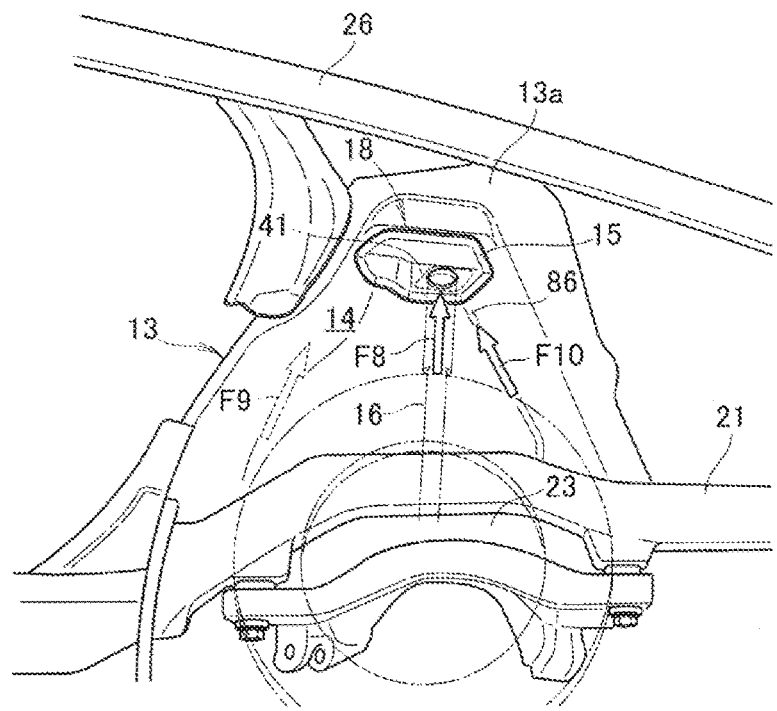
FIGS. 17A and 17B are views for explaining an example in which a damper supporting portion supports a load input from a damper according to the present invention to a damper base.

As illustrated in FIG. 17A, the damper base 15 is provided in the house space 14 of the Wheel house 13, and the attachment bracket 41 of the damper 16 is attached to the damper base 15.

Therefore, the load F8 is input from the damper 16 to the damper attaching portion 91 in a state of running of the vehicle, for example.

Figure 17B:
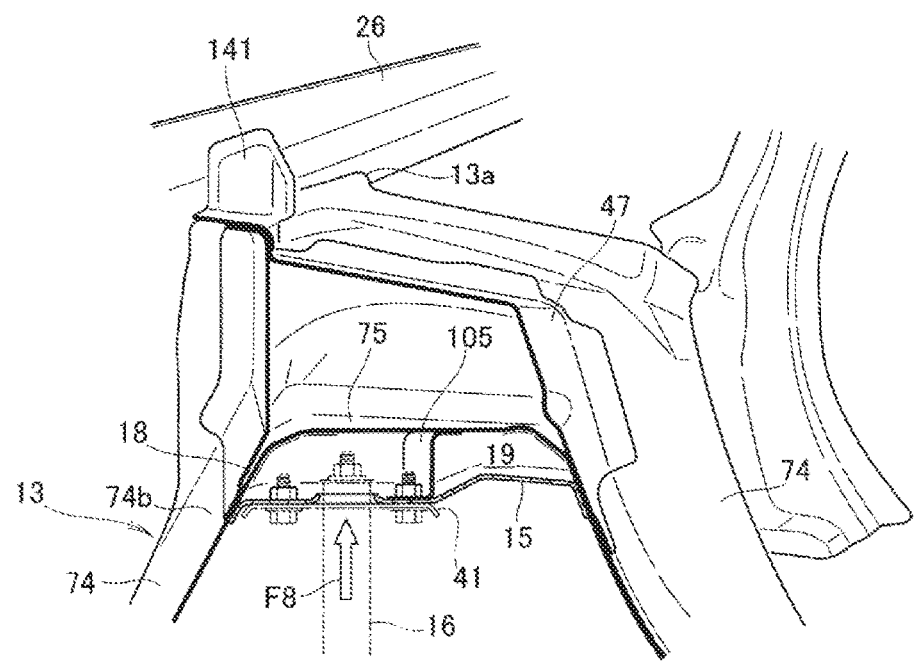

As illustrated in FIG. 17B, the damper base 15 is formed in the bag-like damper supporting portion 18 together with the upper end 74b of the house peripheral wall 74 and the house top portion 75. Further, the bulkhead 105 is provided in the interior 19 of the damper supporting portion 18. Accordingly, the rigidity of the damper supporting portion 18 is increased.

Thus, the load F8 input from the damper 16 to the damper base 15 can be suitably supported by the damper supporting portion 18.

Returning to FIG. 17A, the load F8 input to the damper base 15 is supported by the damper supporting portion 18. In this state, the load F8 transmitted to the damper supporting portion 18 is transmitted to the leg 45 (see FIG. 18A) as a tensile load F9, and is transmitted to the rear leg 86 (see FIG. 18B) as a tensile load F10.

Figure 18A:
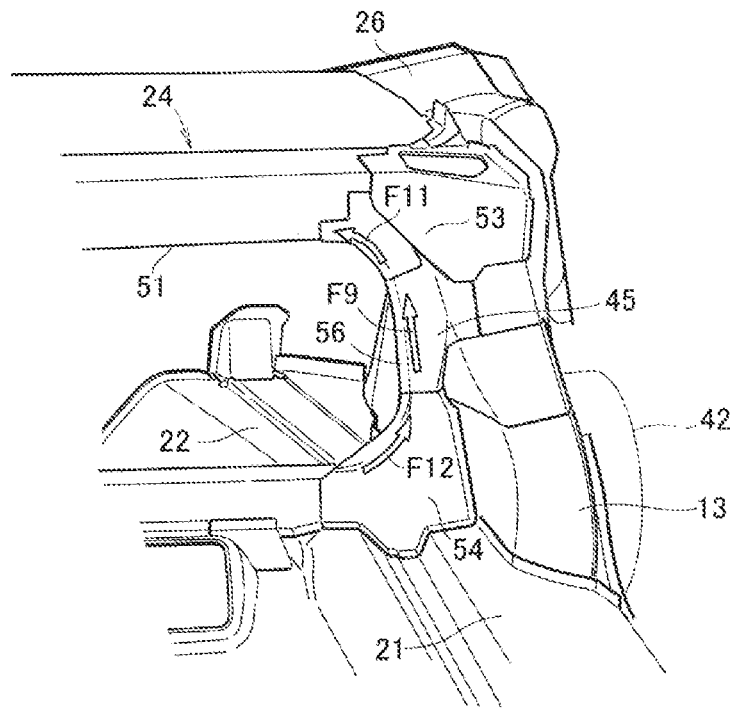
FIGS. 18A and 18B are views for explaining an example in which a rear frame supports the load input from the damper according to the present invention to the damper base.

As illustrated in FIG. 18A, the tensile load F9 is transmitted to the leg 45, whereby a compressive load F11 acts on the upper corner 53 and a tensile load F12 acts on the lower corner 54.

Here, the flange joint portion 56 of the leg 45 extends from the upper corner 53 to the lower corner 54, and the rigidity of the upper corner 53 and the lower corner 54 is secured by the flange joint portion 56.

Thus, the compressive load F11 transmitted to the upper corner 53 can be supported by the flange joint portion 56 of the upper corner 53. In addition, the tensile load F12 transmitted to the lower corner 54 can be supported by the flange joint portion of the lower corner 54.

Figure 18B:
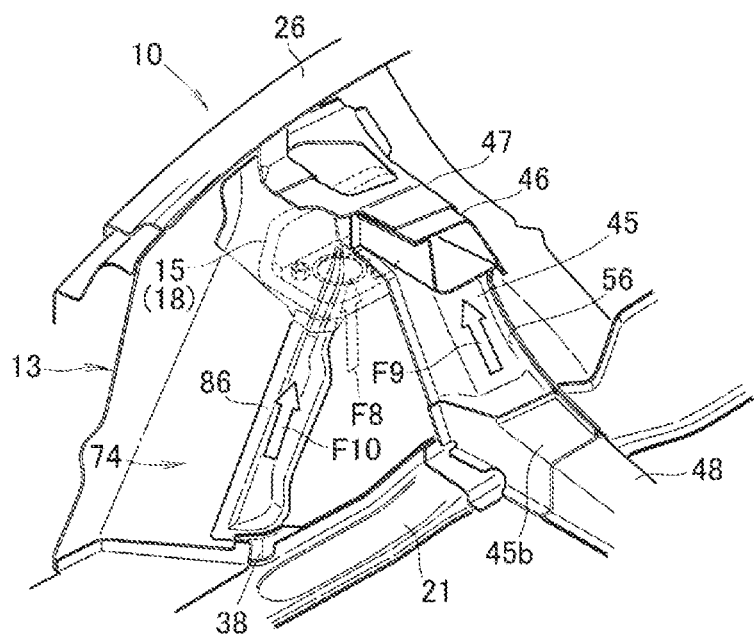

As illustrated in FIG. 18B, the tensile load F9 transmitted to the leg 45 is transmitted to the rear frame 21 through the leg 45. Further, the tensile load F10 transmitted to the rear leg 86 is transmitted to the rear frame 21 through the rear leg 86.

The rear frame 21 is a frame member that extends in the front-and-rear direction of the vehicle body and has high rigidity, and the transmitted tensile load is suitably supported by the rear frame 21.

Next, an example will be described with reference to FIGS. 19A and 19B in which loads F11 to F14 input from the sub-frame 23 to the rear frame 21 are supported by the triangular prism frame body 35.

Figure 19A:
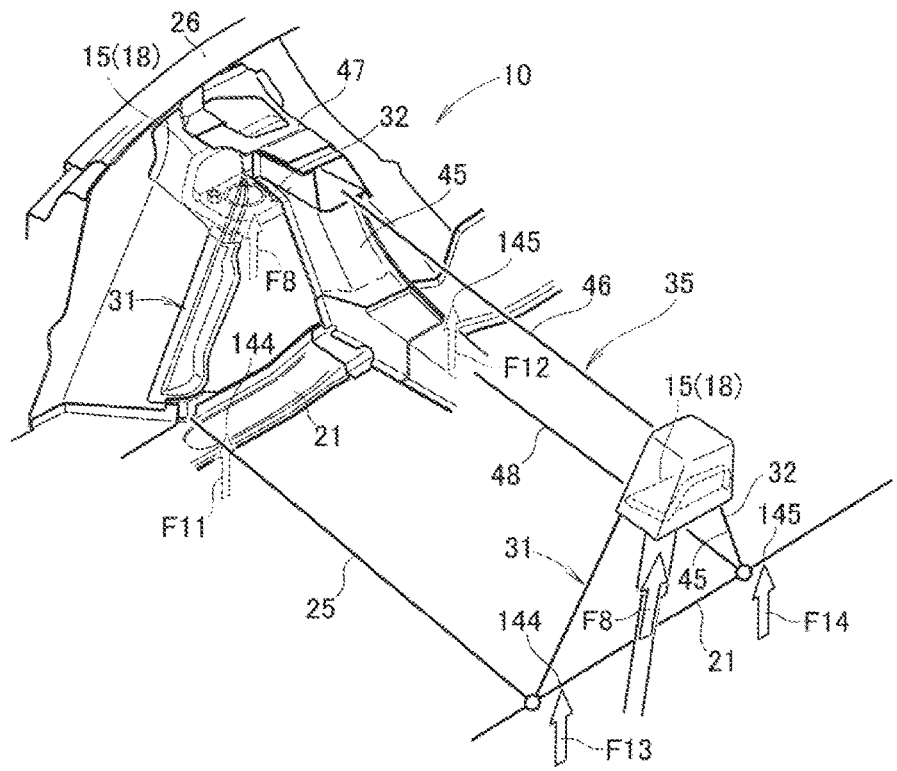
FIGS. 19A and 19B are views for explaining an example in which a triangular prism frame body supports the load input from a sub-frame according to the present invention to a rear frame.

As illustrated in FIG. 19A, the upper part 32 of the left triangular frame 31 is reinforced by the left damper supporting portion 18, and the upper part 32 of the right triangular frame 31 is reinforced by the right damper supporting portion 18. Accordingly, the triangular prism frame body 35 is reinforced by the left damper supporting portion 18 and the right damper supporting portion 18.

Figure 19B:
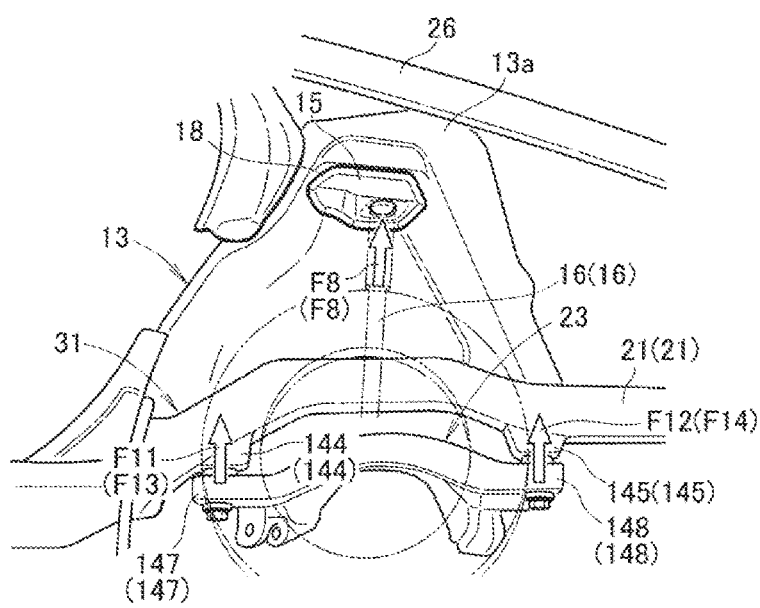

As illustrated in FIG. 19B, the load F8 is input to the left damper supporting portion 18 from the left damper 16, so that the load F11 is transmitted from the front attachment portion 147 on the left side of the sub-frame 23 to the front attachment portion 144 of the left rear frame 21.

In addition, the load F12 is transmitted from the rear attachment portion 148 on the left side of the sub-frame 23 to the rear attachment portion 145 of the left rear frame 21.

Similarly, the load F8 is input to the left damper supporting portion 18 from the left damper 16, so that the load F13 is transmitted from the front attachment portion 147 on the right side of the sub-frame 23 to the front attachment portion 144 of the right rear frame 21.

In addition, the load F14 is transmitted from the rear attachment portion 148 on the right side of the sub-frame 23 to the rear attachment portion 145 of the right rear frame 21.

Returning to FIG. 19A, the load F11 and the load F12 transmitted to the left rear frame 21 are supported by the triangular prism frame body 35 (specifically, the left triangular frame 31). In addition, the load F13 and the load F14 transmitted to the right rear frame 21 are supported by the triangular prism frame body 35 (specifically, the right triangular frame 31).

Thus, it is possible to suppress occurrence of torsional deformation in the vehicle rear body structure 10 (specifically, torsional deformation of the vehicle rear body structure 10 in the vertical direction) by the loads F11 to F14 transmitted from the sub-frame 23, and to improve steering stability.

Further, the triangular prism frame body 35 is reinforced by the left damper supporting portion 18 and the right damper supporting portion 18. Thus, the load F8 transmitted from the left damper 16 (see FIG. 19B) to the left damper supporting portion 18 can be favorably supported by the triangular prism frame body 35 (specifically, the left triangular frame 31).

Similarly, the load F8 transmitted from the right damper 16 to the right damper supporting portion 18 can be favorably supported by the triangular prism frame body 35 (specifically, the right triangular frame 31).

The vehicle rear body structure according to the present invention is not limited to the above-described embodiment, but may be appropriately modified or improved.

For example, the case is described in the above-described embodiment in which the reinforcing leg 17 is provided across the house rear corner ridge 85 of the wheel house 13, but the present invention may be a configuration, which is not provided with the reinforcing leg 17, without being limited thereto.

In this state, the house rear corner ridge 85 and the left leg 45 are provided in an inverted V-shape in a side view. Therefore, the damper supporting portion 18 is supported in a stable state by the house rear corner ridge 85, the left leg 45, and the rear frame 21.

Thus, as in the embodiment, a load transmitted from the damper 16 to the damper supporting portion 18 is transmitted, as a tensile load, to the rear frame 21 through the house rear corner ridge 85 and the leg 45. The tensile load transmitted to the rear frame 21 is suitably supported by the rear frame 21.

In addition, the case is described in the above-described embodiment in which the lower flange 107 of the bulkhead 105 is fastened together with the attachment bracket 41 of the damper 16 and the damper base 15 by the bolt 116 and the nut 117, but the present invention is not limited thereto.

For example, the bulkhead 105 is provided in the vicinity of the bolt 116 and the nut 117 which fasten the attachment bracket 41 of the damper 16 and the damper base 15, so that it is possible to obtain the same effect as the embodiment.

Even in this state, as in the embodiment, the load input from the damper 16 to the damper base 15 is transmitted to the support wall 92 and the house top portion 75 through the bulkhead 105. Thus, the load input to the damper base 15 is suitably supported by the damper supporting portion 18, and deformation of the damper base 15 can be suppressed.

Further, the case is described in the above-described embodiment in which the front attachment portion 144 and the rear attachment portion 145 of the rear frame 21 are provided at the positions adjacent to the front part 33 and the rear part 34 of the triangular frame 31, but the present invention is not limited thereto.

For example, the front attachment portion 144 and the rear attachment portion 145 of the rear frame 21 may be aligned in the vertical direction with respect to the front part 33 and the rear part 34 of the triangular frame 31.

In addition, the vehicle rear body structure, the wheel house, the damper base, the damper, the reinforcing leg, the damper supporting portion, the rear frame, the floor panel, the rear bulkhead, the rear cross member, the triangular frame, the triangular prism frame body, the protruding portion, the leg, the upper cross member, the lower cross member, the bulkhead opening, the upper corner, the lower corner, the flange joint portion, the front plate portion, the rear plate portion, the front leg wall, the front flange, the inner leg wall, the rear leg wall, the rear flange, the house peripheral wall, the house top portion, the house rear corner ridge, the damper attaching portion, the support wall, the peripheral-edge flange, and the bulkhead may be modified to have shapes or configurations other than those illustrated in the above-described embodiment.

INDUSTRIAL APPLICABILITY

The present invention is suitable for application to an automobile having a vehicle rear body structure in which a wheel house is provided in a rear frame extending in a front-and-rear direction of a vehicle body and a damper is disposed on a side of a vehicle exterior of the wheel house.

DESCRIPTION OF REFERENCE NUMERALS AND CHARACTERS 10 vehicle rear body structure
13 wheel house (pair of wheel houses)
14 house space (interior) of wheel house
15 damper base
16 damper
17 reinforcing leg
17a lower end of reinforcing leg
17b upper end of reinforcing leg
18 damper supporting portion
19 interior of damper supporting portion
21 rear frame (pair of rear frames)
22 floor panel
24 rear bulkhead
24a upper end of rear bulkhead (left end 47 of upper cross member)

25 rear cross member
27 vehicle interior
28 rear trunk
31 triangular frame (pair of triangular frames)
32 upper part of triangular frame (upper end 45*a* of leg)
33 front part of triangular frame (lower end 45*b* of led)
34 rear part of triangular frame (lower end 17*a* of reinforcing leg)
35 triangular prism frame body
38 protruding portion
42 rear wheel
45 leg (pair of legs)
45*a* upper end of leg
45*b* lower end of leg
46 upper cross member
48 lower cross member
51 bulk head opening (opening)
53 upper corner
54 lower corner
56 flange joint portion
58 front plate portion
59 rear plate portion
61 front leg wall
63 front flange
65 inner leg wall
66 rear leg wall
68 rear flange
74 house peripheral wall
74*b* upper end of house peripheral wall
75 house top portion
85 house rear corner ridge (house corner ridge)
91 damper attaching portion
91*a* outer part of damper attaching portion
91*b* outer periphery of damper attaching portion
92 support wall
92*a* outer periphery of support wall
93 peripheral-edge flange
105 bulkhead
107 lower flange (lower end) of bulkhead
109 upper flange (upper end) of bulkhead
116, 117 bolt, nut (fastening portion)

The invention claimed is:

1. A vehicle rear body structure comprising:
a rear frame extending in a front-and-rear direction of a vehicle body;
a wheel house provided in the rear frame;
a damper disposed on a side of a vehicle exterior of the wheel house and supporting a rear wheel;
a rear bulkhead that is joined to the wheel house to partition a vehicle interior and a rear trunk and is gradually inclined downward to a front of the vehicle body toward the rear frame; and
a damper base that is joined to the rear bulkhead through the wheel house so as to be disposed on the side of the vehicle exterior of the wheel house and is coupled to the damper, wherein
the wheel house comprises
a house peripheral wall that covers the rear wheel from a side of the vehicle interior and has a house corner ridge which is gradually inclined downward to a rear of the vehicle body toward the rear frame; and
a house top portion that is formed on an upper end of the house peripheral wall,
the damper base is joined to the side of the vehicle exterior of the wheel house so that a damper supporting portion is formed in a bag shape by the damper base and the wheel house,
the damper supporting portion is coupled to the rear frame through the rear bulkhead and is coupled to the rear frame through the house corner ridge,
the rear bulkhead and the house corner ridge are formed in an inverted V-shape in a side view such that a distance between the rear bulkhead and the house corner ridge gradually widens from the damper supporting portion to the rear frame,
the wheel house is provided on both sides in a vehicle width direction of the rear bulkhead,
the rear bulkhead includes
a pair of legs that are respectively joined to the wheel houses provided on the both sides in the vehicle width direction;
an upper cross member that couples upper ends of the pair of legs to each other; and
a lower cross member that is disposed below the upper cross member and couples lower ends of the pair of legs to each other,
the rear bulkhead is formed in an annular shape by the pair of legs, the upper cross member, and the lower cross member so that an opening is formed in the rear bulkhead,
each leg of the pair of legs intersects with the upper cross member so that an upper corner is formed, and each leg of the pair of legs intersects with the lower cross member so that a lower corner is formed,
each leg of the pair of legs includes
a front plate portion that is joined to the wheel house to form a front leg wall of the leg and has a front flange protruding toward a side of the opening; and
a rear plate portion that is joined to the wheel house to form an inner leg wall and a rear leg wall of the leg and has a rear flange joined to the front flange from a side of a rear of the vehicle body,
the front flange and the rear flange are joined to each other to form a flange joint portion,
the flange joint portion protrudes toward the opening, and
the flange joint portion extends to the lower corner from the upper corner.

2. The vehicle rear body structure according to claim 1, wherein
the damper base is joined to one leg of the pair of legs of the rear bulkhead through the wheel house, and
the one leg is joined to the rear frame.

3. The vehicle rear body structure according to claim 1, wherein
the damper base includes
a damper attaching portion that is disposed on the side of the vehicle exterior of the wheel house below the house top portion and is attached with the damper;
a support wall that rises upward from the damper attaching portion; and
a peripheral-edge flange that is formed along an outer periphery of each of the damper attaching portion and the support wall and is joined to the wheel house,
the peripheral-edge flange is joined to the wheel house so that the damper supporting portion is formed in a bag shape,
a bulkhead is provided inside the damper supporting portion,
a lower end of the bulkhead is joined to the damper attaching portion, and an upper end of the bulkhead is joined to the house top portion, and
the lower end of the bulkhead is fastened by a fastening portion with which the damper is attached to the damper supporting portion.

4. The vehicle rear body structure according to claim 1, further comprising:

a reinforcing leg that extends upward from the rear frame along the house corner ridge and is provided in the wheel house across the house corner ridge, wherein the rear frame includes a protruding portion which protrudes upward along the wheel house, the reinforcing leg has a lower end joined to the protruding portion and an upper end joined to the rear bulkhead, the vehicle rear body structure is configured in such a manner that:

the reinforcing leg is provided on the both sides in the vehicle width direction, and the rear frame is also provided on the both sides in the vehicle width direction;

a rear cross member is provided which is laid over the rear frames provided on the both sides in the vehicle width direction and is coupled to a lower end of the reinforcing leg;

a triangular frame is formed to have substantially a triangular shape in a side view by the rear frame, the reinforcing leg, and the leg of the rear bulkhead and is provided on the both sides in the vehicle width direction;

upper parts, front parts, and rear parts of the triangular frames provided on the both sides in the vehicle width direction are coupled to each other by the upper cross member, the lower cross member, and the rear cross member, respectively, thereby forming a triangular frame body; and the damper supporting portion is provided on the upper parts of the triangular frames provided on the both sides in the vehicle width direction.

\* \* \* \* \*